United States Patent
Tazawa et al.

(10) Patent No.: US 7,315,153 B2
(45) Date of Patent: Jan. 1, 2008

(54) SWITCHING POWER SUPPLY IN AN INTEGRATED CIRCUIT HAVING A COMPARATOR WITH TWO THRESHOLD VALUES, A SYNCHRONIZATION INPUT AND OUTPUT, VOLTAGE FEEDBACK AND EFFICIENT CURRENT SENSING

(75) Inventors: Tomohiro Tazawa, Maebashi (JP); Shinichi Yoshida, Takasaki (JP)

(73) Assignee: Renesas Technology Corporation, Tokyo (JP)

( * ) Notice: Subject to any disclaimer, the term of this patent is extended or adjusted under 35 U.S.C. 154(b) by 0 days.

(21) Appl. No.: 10/859,220

(22) Filed: Jun. 3, 2004

(65) Prior Publication Data

US 2005/0052168 A1    Mar. 10, 2005

(30) Foreign Application Priority Data

Sep. 10, 2003  (JP)  .............................. 2003-318189

(51) Int. Cl.
*G05F 1/00* (2006.01)
*H02J 1/00* (2006.01)

(52) U.S. Cl. .................. 323/272; 323/284; 323/351

(58) Field of Classification Search ............ 323/272, 323/284, 285, 282, 283, 351, 350, 290; 363/65
See application file for complete search history.

(56) References Cited

U.S. PATENT DOCUMENTS

| | | | | |
|---|---|---|---|---|
| 4,734,844 A | * | 3/1988 | Rhoads ........................ 363/72 |
| 5,731,694 A | * | 3/1998 | Wilcox et al. ............... 323/287 |
| 5,734,259 A | * | 3/1998 | Sisson et al. ................ 323/282 |
| 5,825,165 A |   | 10/1998 | Kitching et al. |
| 5,905,369 A | * | 5/1999 | Ishii et al. .................... 323/272 |
| 5,912,552 A | * | 6/1999 | Tateishi ....................... 323/285 |
| 5,929,618 A | * | 7/1999 | Boylan et al. ............... 323/282 |
| 5,982,160 A | * | 11/1999 | Walters et al. .............. 323/282 |
| 6,130,528 A | * | 10/2000 | Aoyama ...................... 323/282 |
| 6,229,292 B1 | * | 5/2001 | Redl et al. ................... 323/285 |
| 6,271,650 B1 | * | 8/2001 | Massie et al. ............... 323/272 |
| 6,288,524 B1 | * | 9/2001 | Tsujimoto .................... 323/285 |
| 6,346,798 B1 | * | 2/2002 | Passoni et al. .............. 323/272 |
| 6,424,129 B1 | * | 7/2002 | Lethellier .................... 323/272 |
| 6,461,405 B2 | * | 10/2002 | Reyes ............................. 95/7 |
| 6,462,976 B1 | * | 10/2002 | Olejniczak et al. ......... 363/147 |
| 6,465,993 B1 | * | 10/2002 | Clarkin et al. .............. 323/272 |
| 6,469,481 B1 | * | 10/2002 | Tateishi ....................... 323/282 |
| 6,630,651 B2 | * | 10/2003 | Ohishi et al. ............... 219/662 |
| 6,674,272 B2 | * | 1/2004 | Hwang ........................ 323/284 |

(Continued)

FOREIGN PATENT DOCUMENTS

JP    2002-300769    10/2002

*Primary Examiner*—Karl Easthom
*Assistant Examiner*—Harry Behm
(74) *Attorney, Agent, or Firm*—Mattingly, Stanger, Malur & Brundidge, P.C.

(57) ABSTRACT

A switching power supply circuit in which a series circuit comprising a resistive element and a capacitive element is provided in a parallel configuration with an inductor which supplies a load current to a load circuit, a voltage comparator having first and second threshold voltages discriminates a voltage obtained from a mutual connecting point of the series circuit therefrom and controls a switch element for supplying a current to the inductor, thereby varying the current supplied to the inductor in accordance with a variation in the load current is combined with a series power supply circuit which shares the load current of the load circuit.

6 Claims, 20 Drawing Sheets

U.S. PATENT DOCUMENTS

| | | | |
|---|---|---|---|
| 6,684,378 B2 * | 1/2004 | Yamamoto et al. | 716/10 |
| 6,870,352 B2 * | 3/2005 | Walters et al. | 323/277 |
| 6,879,137 B2 * | 4/2005 | Sase et al. | 323/282 |
| 6,912,144 B1 * | 6/2005 | Clavette | 363/98 |
| 6,979,985 B2 * | 12/2005 | Yoshida et al. | 323/282 |
| 6,984,966 B2 * | 1/2006 | Kubota et al. | 323/282 |
| 7,002,325 B2 * | 2/2006 | Harris et al. | 323/272 |
| 7,005,835 B2 * | 2/2006 | Brooks et al. | 323/282 |
| 7,019,502 B2 * | 3/2006 | Walters et al. | 323/282 |
| 7,026,798 B2 * | 4/2006 | Cheung et al. | 323/225 |
| 7,233,132 B1 * | 6/2007 | Dong et al. | 323/272 |

* cited by examiner

SWITCHING POWER SUPPLY IN AN INTEGRATED CIRCUIT HAVING A COMPARATOR WITH TWO THRESHOLD VALUES, A SYNCHRONIZATION INPUT AND OUTPUT, VOLTAGE FEEDBACK AND EFFICIENT CURRENT SENSING

CROSS-REFERENCE TO RELATED APPLICATION

The present application claims priority from Japanese Patent application JP 2000-318189 filed on Sep. 10, 2003, the content of which is hereby incorporated by reference into this application.

BACKGROUND OF THE INVENTION

The present invention relates to a switching power supply device and a semiconductor integrated circuit employed therein, and to a technique effective if applied to, for example, a switching power supply device mounted to a battery-driven small portable electronic terminal, and a semiconductor integrated circuit used therein.

Electronic apparatuses each equipped with a microprocessor as a system control device have been on the increase in recent years. An operating frequency of the microprocessor (hereinafter called "CPU") tends to increase more and more. The maximum operating current is also on the increase with the increase in the operating frequency. On the other hand, a portable electronic equipment or the like with the CPU built therein often adopts a system for stepping up or down a battery voltage by means of a switching regulator and supplying an operating current to the CPU. However, when the operation of the CPU is not necessary to lessen the battery exhaustion, the whole CPU or some circuits in the CPU are deactivated. Therefore, the width of a change in current consumption of the CPU tends to increase with the increase in the maximum operating current of the CPU. Thus, one excellent in transient response to a change in output current has been required as a power supply device for supplying an operating current to the CPU.

There has heretofore been known one called "hysteresis current mode control system" as a switching regulator excellent in transient response (see, for example, the following U.S. Pat. No. 5,825,165). The switching regulator of the conventionally proposed hysteresis current mode control system has a current sense resistor for detecting a current that flows through a coil connected in series with a coil, and an error amplifier which outputs a current proportional to an error voltage between a voltage (feedback voltage) obtained by dividing an output voltage by a resistance division circuit and a reference voltage. An error voltage expressed in the product of both the value of a resistor connected between a connecting node of the coil and the sense resistor and an output terminal of the error amplifier, and the output current of the error amplifier is compared with the output voltage by a comparator having hysteresis. When a voltage drop developed across the sense resistor exceeds "error voltage+ hysteresis voltage", a main switch that causes current to flow into the coil is switched from on to off, and a sync switch that acts so as to reduce the current supplied to the coil in synchronism with the main switch is switched from off to on. When the voltage drop developed across the sense resistor falls below the error voltage, the main switch is switched from off to on and the sync switch is switched from on to off, thereby controlling the output voltage so as to be constant.

The switching regulator of such a hysteresis current mode control system effects feedback such that the on time of the main switch is made long when the output current increases, and the on time of the main switch is made short when the output current decreases, thereby to prolong the on time of the sync switch, thereby making it possible to quickly respond to a change in output current and make the output voltage constant.

Patent Document 1: U.S. Pat. No. 5,825,165

However, it turned out that the conventional switching regulator of hysteresis current mode control system had the following problems. Firstly, since it has the sense resistor connected in series with the coil, power wastefully consumed or used up by the sense resistor increases. Further, since the power loss increases as the maximum operating current of the CPU becomes large, this leads to an increasingly reduction in power efficiency from now on. It is considered that the value of the sense resistor is lessened to reduce the power loss. However, since a monitor voltage cannot exceed a hysteresis voltage of a comparator where the value of the sense resistor is excessively reduced, a defective condition occurs that a switching frequency is not fixed and the ripple of the output voltage becomes large.

Secondly, since the output of the error amplifier must follow the change in the output current, the characteristic of response to the change in the output current is delayed by the intervention of the error amplifier. Since the error amplifier generally needs a phase compensating circuit for preventing oscillations, a circuit scale becomes large by the provision of the phase compensating circuit.

Thirdly, when the resistance value of the sense resistor is Rcs, the switching frequency fsw of the regulator is expressed in the following equation (1):

$$fsw = Vout(Vin - Vout) \cdot Rcs / Vin \cdot Vhys \cdot L \qquad (1)$$

It is understood from the above equation (1) that the switching frequency fsw depends on the inductance L of a coil. Therefore, the switching frequency changes depending on variations in manufacture of the coil, variations in temperature, and a dc current overlap characteristic. An electronic apparatus having a communication function and an audio reproducing function has the fear of occurrence of beat noise in an audio band due to electromagnetic interference. Incidentally, the dc current overlap characteristic means a phenomenon that the inductance of the coil changes according to the magnitude of a dc current that flows through the coil.

SUMMARY OF THE INVENTION

Fourthly, a problem arises in that when a current I1 that flows through the coil is small, an output current Ierr of the error amplifier becomes innegligible so that (I1−Ierr)·Rcs≈I1Rcs corresponding to the condition that the equation (1) is established is not established, thereby causing a change in switching frequency, and since the monitor voltage cannot exceed the hysteresis voltage of the comparator, the switching frequency is not fixed and hence the ripple of the output voltage increases.

Therefore, the applicant of the present application has developed a switching power supply device configured in such a manner that in the switching regulator of the hysteresis current mode control system, the sense resistor which is connected in series with the coil and detects the change in the output current is eliminated and instead means for detecting a change in output voltage is provided, and the detected voltage is inputted to a comparator having hysteresis characteristics, where it is compared with a reference voltage, and a feedback signal to a switching control circuit for on/off-controlling a main switch and a sync switch is generated by the comparator. As the means for detecting the change in the output voltage, a resistor and a capacitor provided in a series configuration are used which are connected in parallel with a coil. The potential at a connecting node of these resistor and capacitor is inputted to the comparator.

Since such a switching power supply device is not provided with the sense resistor which is connected in series with the coil and through which the current flowing into the coil is caused to flow, a power loss can be reduced. Since the error amplifier becomes unnecessary, the characteristic of response to each of a change in input voltage and a change in output voltage is improved. The provision of the phase compensating circuit becomes unnecessary and hence a circuit scale can be reduced correspondingly. Further, the switching frequency does not depend on manufacture variations in coil's inductance, variations in temperature, the magnitude of a current that flows through the coil, etc. and hence the ripple of the output voltage can be reduced.

In recent years, however, an electronic apparatus incurs an increase in the current consumed by the LSI (Large Scale Integration) with the high function and high-speed operation as described above, whereas an electronic apparatus such as a portable device with a battery as a power supply needs to prolong the life of the battery. Therefore, there has been increasingly demand for a switching regulator high in power conversion efficiency as an alternative to the series regulator used up to now. There has further been a demand for a regulator high in power conversion efficiency even at such a light load that the LSI is placed in a standby state, as well as when the load current is large. Furthermore, the operating voltage of the LSI tends to decrease with the advance of miniaturization of the LSI. Therefore, the proportion of a ripple voltage developed by switching of a switching regulator at the light load, in the output voltage also tends to increase. As a result, there is a possibility that when the output voltage falls short of the lowest operating voltage of the LSI, the LSI will malfunction. Therefore, there has also been a demand for a reduction in the ripple voltage at the light load. With the foregoing in view, the applicant of the present application has led the invention of the present application to achieve a further improvement in performance and a further improvement in function with the switching power supply device previously developed by the applicant of the present applicant as the basics.

An object of the present invention is to provide a high performance and high function switching power supply device having a simple configuration, and a semiconductor integrated circuit used therein. Another object of the present invention is to provide a high performance switching power supply device adapted to a low voltage operation of a load circuit, and a semiconductor integrated circuit used therein. The above of the present invention, and other objects and novel features thereof will become apparent from the description of the present Specification and the accompanying drawings.

A summary of a typical one of the inventions disclosed in the present application will be explained in brief as follows: A switching power supply circuit in which a series circuit comprising a resistive element and a capacitive element is provided in a parallel configuration with an inductor which supplies a load current to a load circuit, a voltage comparator having first and second threshold voltages discriminates a voltage obtained from a mutual connecting point of the series circuit from the threshold voltages and thereby controls a switch element for supplying a current to the inductor, thereby varying the current supplied to the inductor in accordance with a variation in the load current is combined with a series power supply circuit which shares the load current of the load circuit.

A summary of another typical one of the inventions disclosed in the present application will be described in brief as follows: A switching power supply circuit in which a series circuit comprising a resistive element and a capacitive element is provided in a parallel configuration with an inductor which supplies a load current to a load circuit, a voltage comparator having first and second threshold voltages discriminates a voltage obtained from a mutual connecting point of the series circuit from the threshold voltages and thereby controls a switch element for supplying a current to the inductor, thereby varying the current supplied to the inductor in accordance with a variation in the load current is provided with an external sync input control circuit which has a sync terminal inputted with a synchronizing signal for periodically bringing the switch element to an on state when the frequency for the discriminating operation of the voltage comparator is less than or equal to a predetermined frequency. Using the external sync input control circuit, another switching power supply device is caused to carry out a parallel operation while being sync-operated in synchronism with a switch element of one switching power supply device.

Only a series regulator is automatically operated upon a light load without providing a peculiar switching control circuit. Thus, a ripple voltage at the light load is low and power conversion efficiency can be improved. Since a drive frequency continuously changes according to a load current upon switching between the operation and stop of switching of a switching regulator, a switching power supply circuit is capable of reducing a change in output voltage at the switching between the operation and stop of switching thereof.

Alternatively, since the setting of an external sync clock frequency to greater than or equal to an audio frequency by an external sync input control circuit enables prevention of a drive frequency from being reduced to the audio frequency or less, the frequency can be set so as not to fall into an audio frequency band while high efficiency and a low ripple voltage are being maintained in a wide range from a light load to a heavy load. It is also possible to perform a parallel redundancy operation without the need for a complicated circuit used for carrying out load sharing. Executing phase shifting makes it possible to carry out even low rippling of an input/output voltage together.

DETAILED DESCRIPTION OF THE INVENTION

Figure 1:
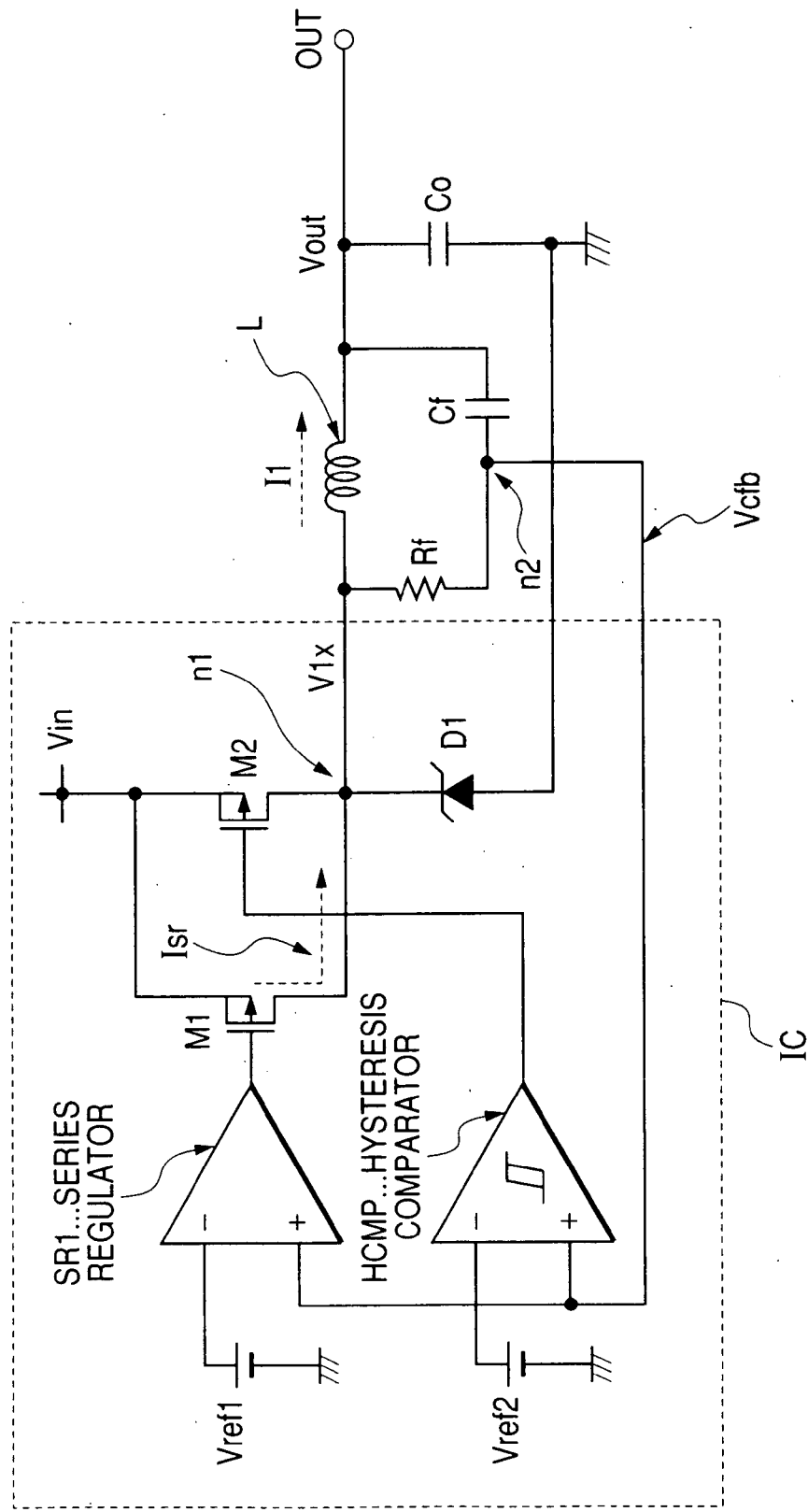
FIG. 1 is a schematic block diagram showing one embodiment of a switching power supply device according to the present invention.

A schematic block diagram of one embodiment of a switching power supply device according to the present invention is shown in FIG. 1. The switching power supply device showing the present embodiment comprises a combination of a switching power supply circuit and a series power supply circuit. Although not restricted in particular, the switching power supply circuit includes a P channel MOSFETM2 used as a switch element and a diode D1 used as an element for voltage-clamping a back electromotive voltage developed across a coil L both of which are connected in series between a dc voltage Vin supplied from an unillustrated DC power supply such as a battery and a ground point (GND), the coil L used as an inductor connected between an intermediate node n1 between the MOSFETM2 and the diode D1 and an output terminal OUT, a smoothing capacitor C0 connected between the output terminal OUT and the ground point, a resistor Rf and a capacitor Cf provided in a series configuration, which are parallel-connected with the coil L, and a hysteresis comparator HCMP which compares a potential Vcfb of a connecting node n2 of the series-configured resistor Rf and capacitor Cf and a reference voltage (Vref2_H, Vref2_L) supplied from a reference voltage source Vref2. The switching power supply circuit is configured in such a manner that the output of the comparator HCMP is applied to the gate of the MOSFETM2 to on/off-control the MOSFETM2.

Referring to FIG. 1, a semiconductor integrated circuit device (LSI) used as a load like a CPU operated in response to the supply of a voltage Vout from the switching power supply device of the present embodiment is provided at the output terminal OUT although not shown in the figure. The MOSFETM2 used as the switch element is turned on and off so that current corresponding to a duty ratio of an on/off control pulse is outputted from the coil L1. Here, the hysteresis comparator HCMP is such a comparator that when a voltage Vcfb inputted to a non-inversion input terminal (+) is higher than the reference voltage applied to an inversion input terminal (−), the threshold value thereof is taken low (Vref2_L), whereas when the voltage Vcfb inputted to the non-inversion input terminal (+) is lower than the reference voltage applied to the inversion input terminal (−), the threshold value thereof is taken high by a predetermined potential (Vref2_H). Since the comparator having such characteristics is well known, the illustration and description of a specific circuit are omitted in the present embodiment. It is however desired that the comparator used here makes use of a circuit high in input impedance, which comprises MOSFETs.

In FIG. 1, a portion surrounded by a dashed line is configured as a semiconductor integrated circuit IC on one semiconductor chip like monocrystal silicon. That is, the smoothing capacitor C0, the coil L, the capacitor Cf and the resistor Rf are connected as outboard or external elements. However, the present invention is not limited to such a configuration. The MOSFETM2 and the diode D may also be configured as external elements to realize a higher-accuracy regulator. The diode D1 may be replaced with such an N channel MOSFETM3 as to be on/off-operated complementary to the MOSFETM2 used as the switch element. In this case, the MOSFETM3 may be built in the IC or configured as an external element.

When the MOSFETM3 is used as an alternative to the diode D1, there is a need to provide a switching control circuit to be described later so as to prevent the flowing of a large current between the input voltage Vin and the ground point GND with simultaneous turning on of the MOSFETM2 and M3 and provide a dead band by use of a delay circuit or the like provided in the switching control circuit. In order to provide such a configuration that the MOSFETM2 and M3 are complementarily operated to avoid the flow of a through current, although not restricted in particular, the delay circuit provided in the switching control circuit makes use of such a delay circuit that the output thereof is delayed when an incoming input pulse changes from L to H, whereas the output thereof is not delayed when the input pulse changes from H to L. Thus, the period (dead band) in which the MOSFETM2 and M3 are both turned off upon switching can be provided.

The MOSFETM2 and M3 (or diode D1) may be built or incorporated into an IC chip, or the coil L1, capacitor Cf and resistor Rf may be brought into the IC chip. Incorporating these devices into the IC chip makes it possible to reduce the number of parts of the power supply device and bring it into less size. It is desired that since a power supply device used in a system large in its output current needs to supply a relatively large current, the switch elements M2 and M3 (or diode D1) are configured of the external elements as described above. However, a power supply device used in a system low in its output current is capable of using elements formed on a chip.

Specific operations of the switching power supply device will be explained using a timing chart shown in FIG. 19. In the switching power supply device according to the embodiment of FIG. 1, the output of the hysteresis comparator is inverted when the potential Vcfb of the connecting node n2 of the resistor Rf and the capacitor Cf becomes lower than the reference voltage Vref2 inputted to the hysteresis comparator HCMP. In doing so, the switch M2 that causes current to flow into the coil L is switched from an off state to an on state, so that the diode D1 (M3) that acts so as to reduce the current flowing into the coil L is switched from an on state to an off state in synchronism with the switching of the switch element M2. Thus, the current flows from the input voltage Vin to the coil L via the switch element M2. At this time, the capacitor Cf is charged through the resistor Rf so that the potential Vcfb of the connecting node n2 rises gradually.

When the potential Vcfb of the connecting node n2 becomes higher than Vref2+Vhys(Vref2_H) with a hysteresis voltage width of the hysteresis comparator HCMP as Vhys, the output of the hysteresis comparator HCMP is inverted. Thus, since the hysteresis comparator HCMP changes an output signal to a high level, the P channel MOSFETM2 used as the switch element is switched from the on state to the off state. At this time, a back electromotive voltage is developed across the coil L to bring the potential at the node n1 to a negative voltage. However, the diode D1 is brought to an on state to clamp the potential of the node n2 to GND-Vf (where Vf: forward voltage of diode D1). When the MOSFETM3 is used as described above, the potential is clamped to GND with the turning on of such a MOSFETM3 so that a current I1 flowing through the coil L is formed. Thus, the current that flows through the coil L with the turning on of the diode D1 or MOSFETM2 is reduced. At this time, the capacitor Cf is discharged via the resistor Rf and hence the potential Vcfb of the connecting node n2 becomes gradually low.

Figure 19A:
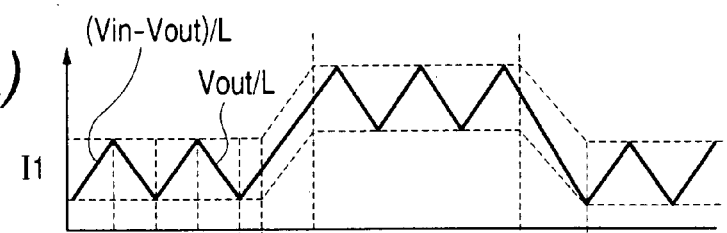
FIG. 19 is a timing chart for describing specific operations of the switching power supply device shown in FIG. 1.

With the repetition of the above operation, the coil I1 that flows through the coil L varies in the form of a triangular wave as shown in FIG. 19(A). The temporal amount of change in the coil current I1 during a period of an increase in the coil current I1 and the temporal amount of change in the coil current 11 during a period of a decrease in the coil current 11 respectively result in (Vin−Vout)/L during the increase period and Vout/L during the decrease period, assuming that the inductance of the coil L is L. On the other hand, assuming that the resistance value of the resistor Rf is R and the current that flows to charge and discharge the electrical charge of Cf is Ic, the current results in Ic=(Vin−Vout)/R during its increase period and the current results in Ic=Vout/R during its decrease period. Thus, the resistor Rf is used to transfer the amount of change in the coil current I1 to the node n2 linearly.

Thus, the substantially stable current I1 flows through the coil L in a steady state in which an output current Iout is constant (during periods of T1, T3 and T5 shown in FIG. 19). When a duty ratio ton/(ton+toff) of a signal for on/off-controlling the MOSFETM2 corresponding to the switch element is N, the output voltage Vout of the regulator is expressed in Vout=N·Vin. Here, the term ton indicate an on period of the switch, and the term toff indicates an off period thereof. Incidentally, when switching is performed between the MOSFETM2 corresponding to the switch element and the MOSFETM3 (brought to an on state in response to the back electromotive voltage when it is of the diode D1), predetermined dead bands are respectively provided for the MOSFETs as shown in FIGS. 19(D) and 19(E) to perform such control as to avoid the flowing of the through current therethrough with the simultaneous turning on of the two switches.

Figure 19B:
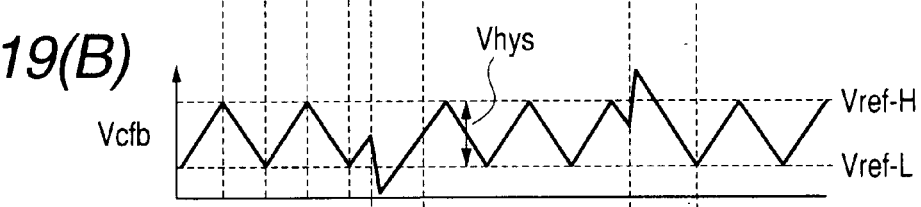
Figure 19C:
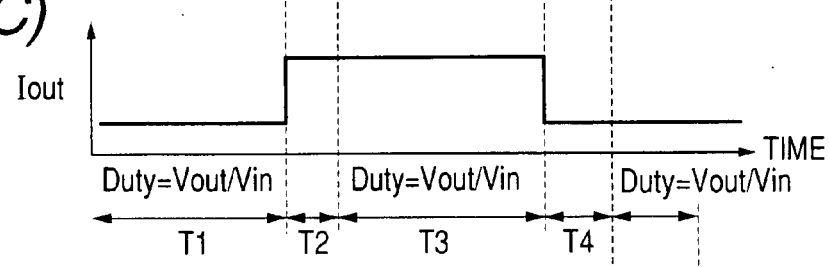
Figure 19D:
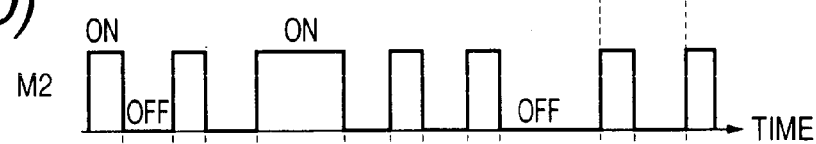
Figure 19E:
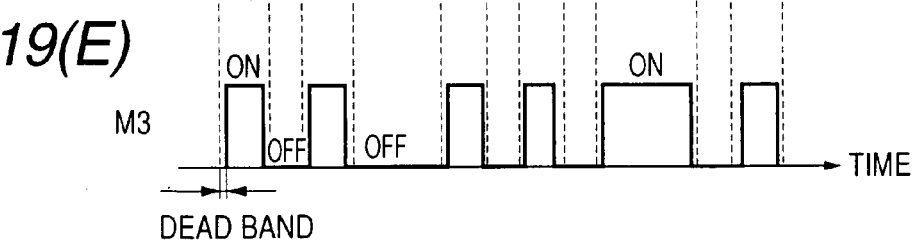

In a transition state (T2) in which the output current Iout increases, the output voltage Vout suddenly drops and a change in its potential is transferred to the connecting node n2 via the capacitor Cf in accordance with its drop, so that the potential Vcfb at the connecting node n2 is abruptly lowered as shown in FIG. 19(B). Thus, the time (corresponding to the off time of M3) provided to turn on the MOSFETM2 corresponding to the switch element is prolonged as shown in FIG. 19(D). In a transition state (T4) in which the output current Iout decreases, the potential Vcfb of the connecting node n2 rises according to a sudden increase in the output voltage Vout, whereby the circuit is activated so as to prolong the time required to turn off the MOSFETM2 used as the switch element as shown in FIG. 19(D). Although not shown in FIG. 19, when the output current Iout goes into a transition state of its increase (T2) when the current I1 of the coil decreases, the circuit is operated so as to shorten the time (on time of M3) required to turn off the MOSFETM2 used as the switch element. Further, when the output current Iout falls into a transition state of its decrease (T4) when the current I1 of the coil increases, the circuit is activated so as to prolong the time required to turn on the MOSFETM2 used as the switch element.

In the switching regulator of the conventional hysteresis current mode control system like the patent document 1, the change in output voltage has been fed back to the hysteresis comparator via the error amplifier. In the present embodiment, however, the response to the change in the output current Iout is improved because the change in the output voltage is immediately transferred to the hysteresis comparator HCMP via the capacitor Cf as described above. Further, since the change in output is transferred to the comparator HCMP high in input impedance via the capacitor Cf, an influence on the output voltage Vout is also small. Since a change in the input voltage Vin is also transferred to the connecting node n2 via the resistor Rf and fed back to the hysteresis comparator HCMP, the response of the regulator to the change in the input voltage Vin becomes also fast.

A switching frequency fsw of the switching power supply circuit of the present embodiment is expressed in the following equation (2):

$$fsw = Vout(Vin - Vout)/Vin \cdot Vhys \cdot Rf \cdot Cf \quad (2)$$

It is understood from the expression (2) that although the switching frequency fsw employed in the present embodiment depends on the values of the resistor Rf and the capacitor Cf, it does not depend on the inductance of the coil L. The resistive element which is small in manufacture variation is easily got as compared with the coil. As the capacitive element, one substantially identical to the coil in manufacture variation but low in temperature characteristic is available at low cost as compared with the coil. Since the inductance value of the coil is not contained in the expression (2) indicative of the switching frequency, there is no need to take into consideration a problem peculiar to the coil, which is called the dc current overlap characteristic that the inductance value varies according to flowing currents.

Therefore, variations in the switching frequency fsw can be lessened as compared with the conventional switching regulator of hysteresis current mode control system.

Further, the switching power supply circuit of the present embodiment needs not provide a sense resistor connected in series with the coil L. Although the resistor is used even in the present embodiment, it is connected in series with the capacitor and hence the path to the dc current is not provided. Therefore, the switching power supply circuit can be reduced in power loss as compared with the conventional switching regulator of hysteresis current mode control system. Since the error amplifier becomes unnecessary, the response is improved and there is no need to provide a phase compensating circuit. Hence a circuit scale can be reduced correspondingly.

As described above, the switching power supply circuit of the present embodiment makes use of the CR feedback hysteresis control as the control system. In the CR feedback hysteresis control circuit, at least one resistor and at least one capacitor are series-connected to each other and parallel-connected to the coil. Then, the voltage obtained by adding the voltage Vout of the output terminal OUT to the voltage proportional to the current that flows through the coil from between the resistor and the capacitor or between the capacitor and the capacitor is detected as the CR feedback voltage Vcfb. Then, the reference voltage Vref2 and the CR feedback voltage Vcfb are compared to perform a hysteresis operation, thereby performing switching.

In order to improve stability or the like at a light load current in such a switching power supply circuit, a series regulator is utilized in combination. The drain of an output stage MOSFETM1 of the series regulator comprises a P channel MOSFET and is connected to the connecting point n1 of the output-stage highside MOSFETM2 and the output-stage diode D1 in the switching power supply circuit. Further, the series regulator is connected in parallel with respect to the switching power supply circuit. A voltage outputted from the series regulator is outputted to the output terminal OUT via the smoothing coil L. Since the relationship between a voltage Vlx at the connecting point n1 of the output-stage MOSFETM2 and the diode D1 in the switching power supply circuit and the output voltage Vout is expressed in voltage Vlx=Vout, the CR feedback voltage Vcfb of the switching regulator results in Vcfb=Vout. Therefore, it can be provided as the feedback voltage of the series regulator. The series regulator compares the CR feedback voltage Vcfb and a reference voltage Vref1 and controls the CR feedback voltage Vcfb such that it becomes equal to the reference voltage Vref1.

Figure 2:
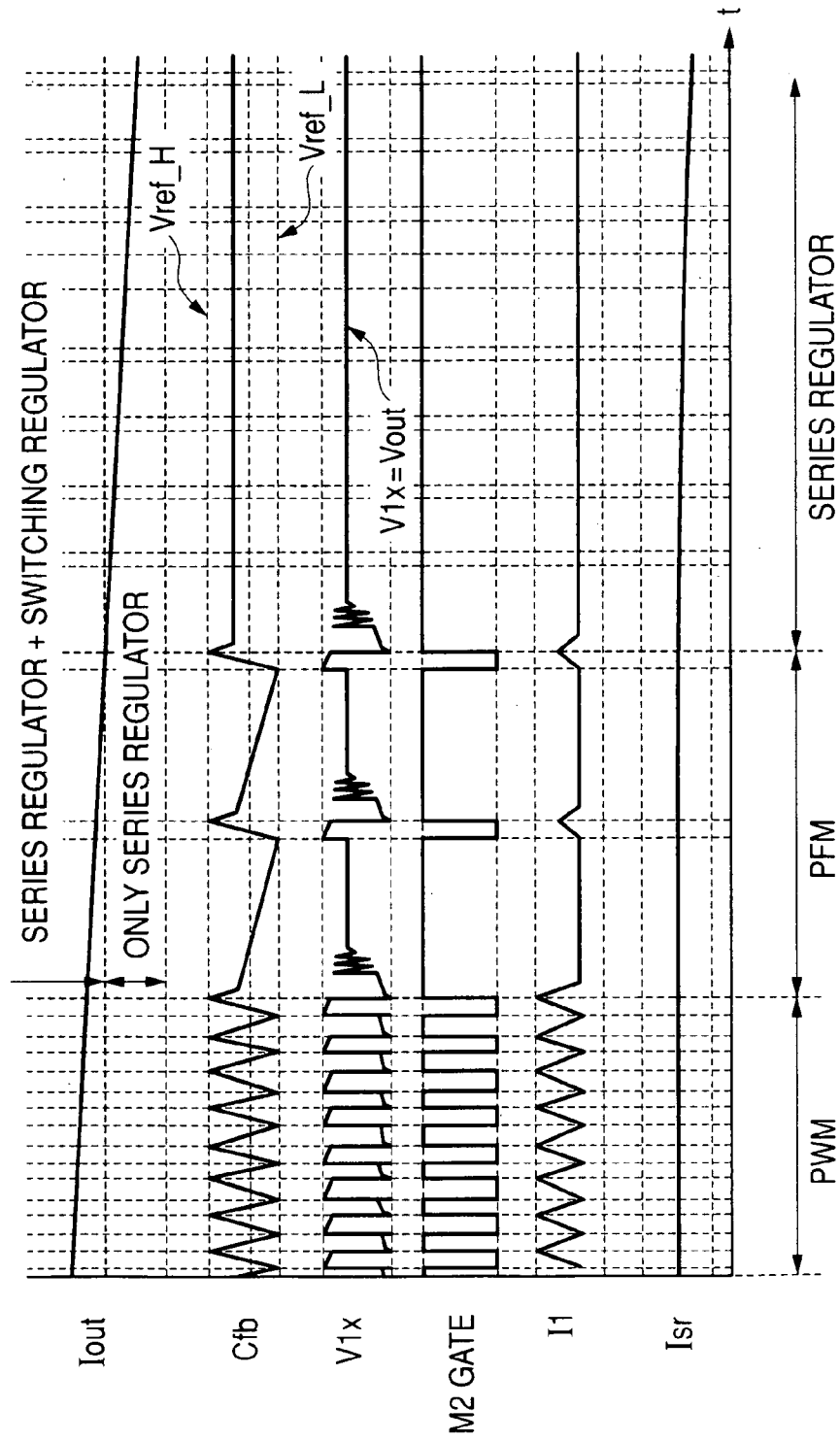
FIG. 2 is a waveform diagram for describing one example of the operation of the switching power supply device according to the present invention.

A waveform diagram for describing one example of the operation of the switching power supply device according to the present invention is shown in FIG. 2. When the CR feedback voltage Vcfb exceeds an upper reference voltage Vref_H in a continuous mode in which the value of the output current Iout is large, the output stage MOSFETM2 is brought to an off state, whereas when the CR feedback voltage Vcfb is below a lower reference voltage Vref_L in the continuous mode, the output stage MOSFETM2 is brought to an on state, whereby the above PWM control is carried out which keeps a drive frequency constant and varies duty (Duty) by the ratio between the input voltage Vin and the output voltage Vout.

In a range (at a middle load) in which an output current cannot be supplied by the series regulator alone during a discontinuous mode in which the value of the output current Iout is small, the switching power supply circuit is operated together with the series regulator under PFM control. Although, upon the middle load, the energy charged into the smoothing coil L per unit time by switching is larger than the energy consumed by a load circuit, and the direction of the current flowing through the coil is intended to be reversed from the output terminal OUT to the node n1, the backflow of the current flowing through the coil is prevented by the diode D1. Therefore, the PFM control is reached in which the CR feedback voltage Vcfb is hard to reach the lower reference voltage Vref_L and the off period of switching is varied according to the magnitude of the load current (Iout).

In a light load range in which the load current I1 becomes small and the output current can be supplied by the series regulator alone, the switching power supply circuit stops switching and the output current is supplied by the series regulator alone. Even in a load current region in which the switching power supply circuit is operated by the series regulator alone, the switching regulator is always in operation, in other words, it is placed in a state of being capable of substantially operating in response to an increase in load current. However, the switching operation of the MOSFETM2 and the diode D1 (MOSFETM3) is at a halt apparently. Since the CR feedback voltage Vcfb is not below the lower reference voltage Vref_L, this state indicates a region in which the off period of the switching becomes infinite.

The series regulator may always be operated or may be operated upon turning off of the output stage MOSFETM2 in synchronism with the output stage MOSFETM2 of the switching regulator as will be described later. Thus, in the series regulator built-in type switching power supply device according to the present invention, the series regulator is parallel-connected to the switching power supply circuit for the CR feedback hysteresis control to thereby perform automatic switching of a control system in accordance with the load current without using the circuit for detecting the load current. Therefore, there is no need to provide a load detect signal for performing switching between the series regulator and the switching power supply circuit in accordance with the load current and newly add a switching circuit, and the number of elements can be reduced, thus enabling a size reduction and a reduction in current consumption.

Figure 3:
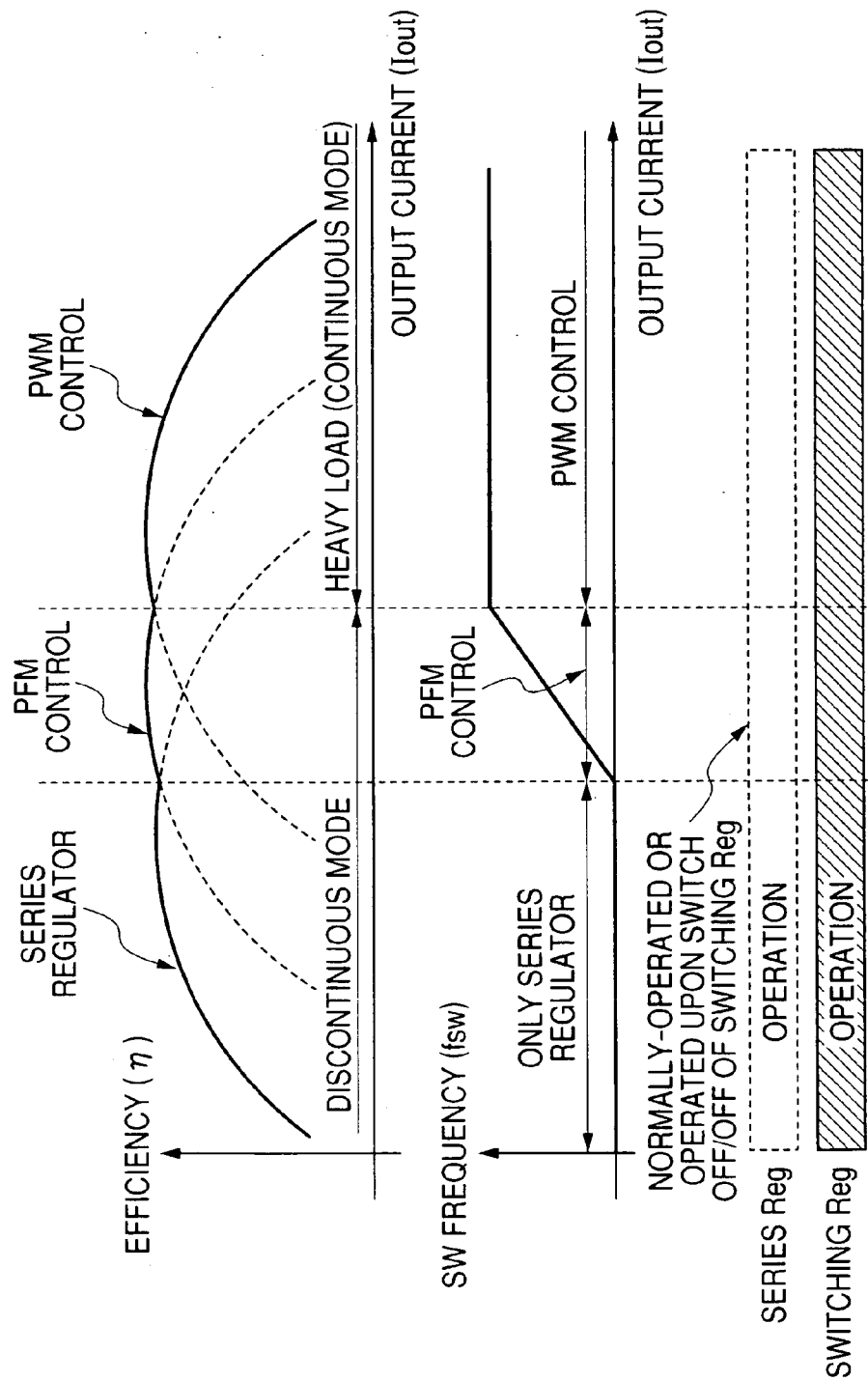
FIG. 3 is a characteristic diagram for describing one example of the operation of the switching power supply device according to the invention of the present application.

A characteristic diagram for describing one example of the operation of the switching power supply device according to the invention of the present application is shown in FIG. 3. In the present embodiment of the present application, the switching power supply circuit performs PFM control in which an on period is constant and an off period varies according to the load, upon a middle load and thereby holds power conversion efficiency high, thus making it possible to maintain high efficiency in a wide range from a light load to a heavy load. Since the series regulator built-in type switching power supply device according to the present embodiment is placed in the PFM control region immediately before a load current becomes small and the switching of the switching power supply circuit stops, a drive frequency gradually decreases with the decrease in the load current and the switching stops when the drive frequency reaches 0 Hz. Therefore, the switching power supply device is capable of reducing a change in output voltage at the switching between the series regulator and the switching regulator and supplying an output voltage stable from the light load to the heavy load.

In addition to the feature that the efficiency at the light load is good, the series regulator has the feature that since the output voltage is controlled using the region in which the on resistance of the MOSFETM1 changes linearly, the ripple voltage is extremely small. There is a need to reduce a switching frequency when an attempt is to improve power conversion efficiency at the light load by use of the switching regulator. With its reduction, the ripple voltage of the output voltage is skewed toward its increase. There is also a need to increase the capacitance of an output capacitor in order to reduce the ripple voltage, thus resulting in increases in packaging area and cost. On the other hand, when the series regulator is activated at the light load, the ripple of the output voltage can be lessened without using an output capacitor having a large capacitance.

Figure 20:
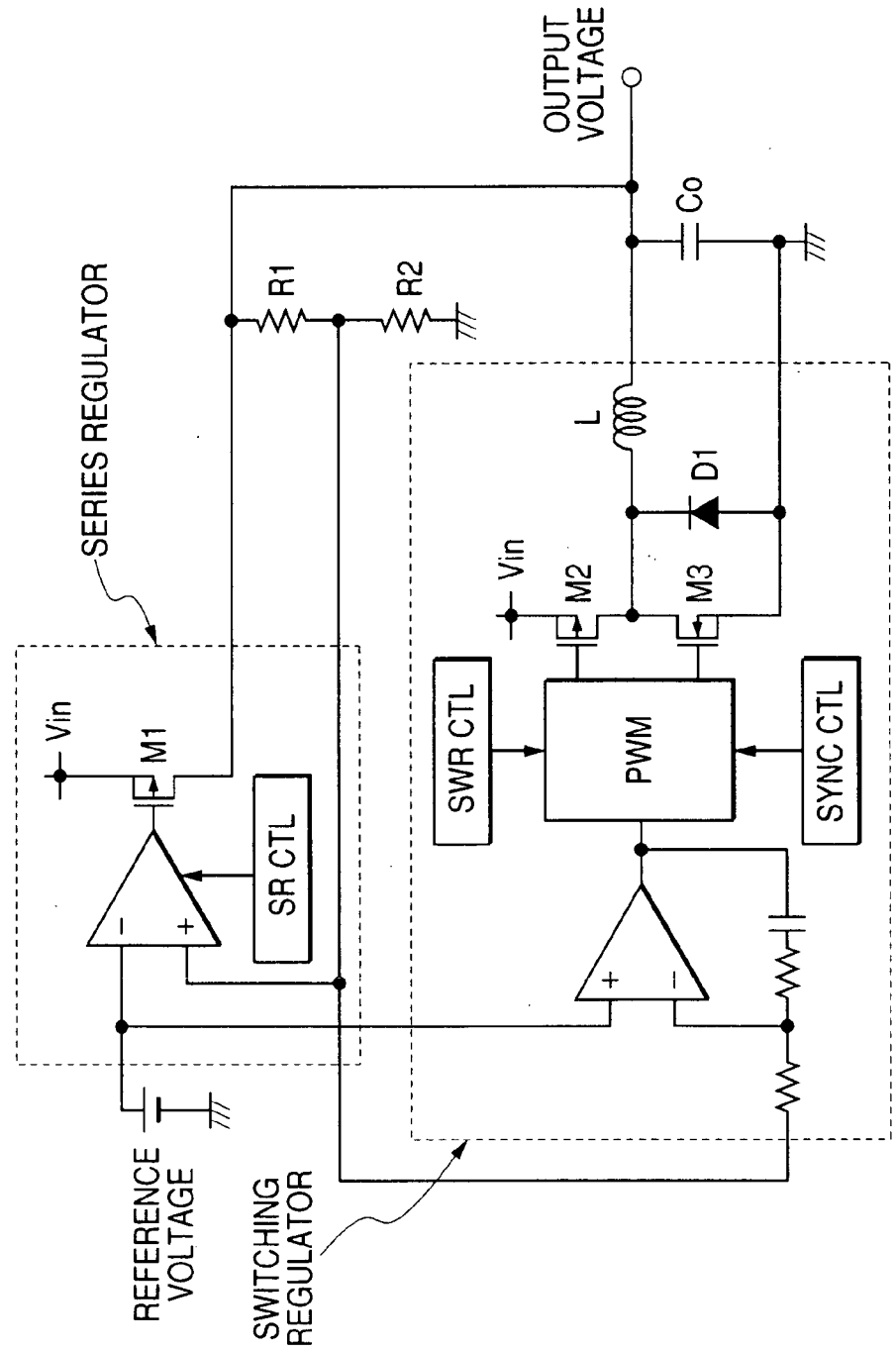
FIG. 20 is a block diagram showing a power supply device discussed prior to the present invention.

Incidentally, a block diagram of a power supply device utilizing the series regulator and the conventional switching regulator in combination is shown in FIG. 20. In such a power supply device discussed prior to the present invention, the drain of an output stage MOSFETM1 of the series regulator is connected to a connecting point of a smoothing coil L for the switching regulator and an output capacitor Co, and the switching regulator and series regulator are parallel-connected to an output terminal to which a load is connected. For the purpose of switching of operation/stop between the series regulator and the switching regulator, automatic discriminating/switching circuits SRCTL and SWRCTL for the series regulator and switching regulator, and a synchronous/asynchronous switching circuit SYNCCTL are provided according to the magnitude of a load current. When the load current is large, the switching regulator is operated under PWM control and the series regulator is deactivated. On the other hand, when the load current is small, the switching regulator is deactivated and only the series regulator is activated.

At the switching between the series regulator and the switching regulator, the synchronous/asynchronous switching circuit SYNCCTL is used to bring a MOSFETM3 on the low side, of the switching regulator to an off state, thereby supplying a current from a diode D1. Consequentially, a through current that flows from the series regulator to the MOSFETM3 on the low side, of the switching regulator is prevented and a change in output voltage at the switching is reduced. Thus, the series regulator is operated at the light load to thereby make it possible to output an output voltage low in ripple voltage while maintaining high power conversion efficiency at the light load. In terms of efficiency, electronic equipment such as a portable device with a battery as a power supply maintains high power conversion efficiency even at such a light load that an LSI is placed in a standby state. Thus, it is useful because an increase in the life of the battery can be achieved. Since there is a possibility that the LSI will malfunction where the ripple voltage falls below the lowest operating voltage of the LSI, it is advantageous to achieve a reduction in the ripple voltage at the light load.

However, it turned out that the present power supply device had the problem that the output voltage varied in the instant of performing switching between the series regulator and the switching regulator. Since there is a possibility that the LSI will fail to operate normally where the change in the output voltage is below the lowest operating voltage of the LSI, a problem arises in that the output voltage varies at the moment of its switching. As to the detection of the switching, a load current is detected and switching is performed between the series regulator and the switching regulator by use of several switching circuits. When, for example, a load detection resistor is used to perform load detection, power consumed by the detection resistor upon a heavy load results in a negligible value even in the case of a slight resistance value, thus causing a problem in that a reduction in power conversion efficiency is incurred.

A problem arises in that the use of plural switching circuits with the load current as a detect signal leads to an increase in the area of the device. Further, the use of the switching circuits in plural form leads to an increase in current consumption of the regulator per se, thereby decreasing power conversion efficiency. Since the proportion of current consumption in the output current becomes large upon the light load in particular, a problem arises in that the current consumption of the regulator per se is large.

Figure 21:
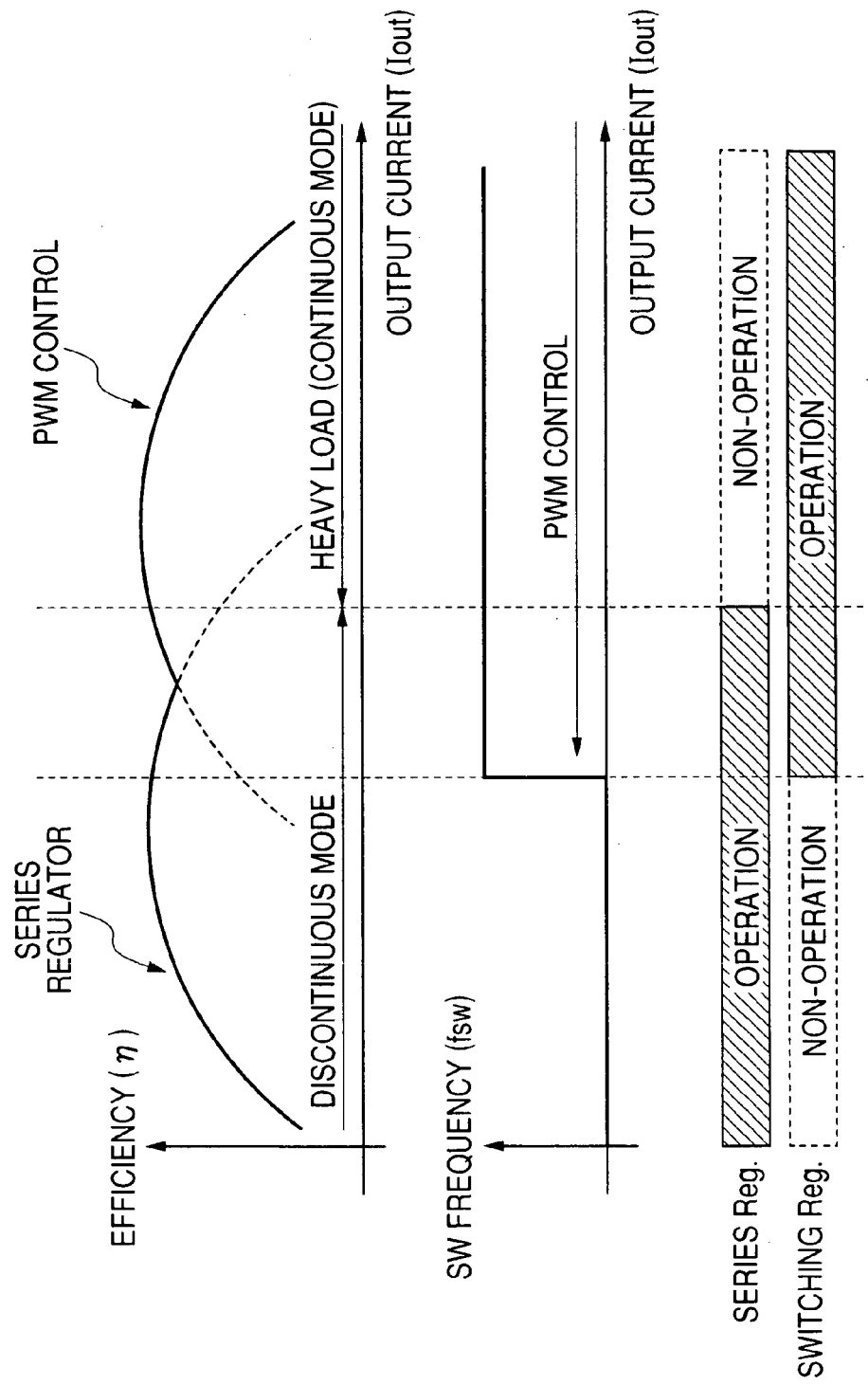
FIG. 21 is a characteristic diagram for describing one example of the operation of the power supply device shown in FIG. 20.

A characteristic diagram for describing one example of the operation of the power supply device shown in FIG. 20 is illustrated in FIG. 21. In the power supply device shown in FIG. 20, a load current is detected to thereby perform switching between a series regulator and a switching regulator. Upon a light load, the power supply device is operated by the series regulator alone, whereas the power supply device is activated by only the switching regulator using PWM control upon a heavy load, whereby high efficiency is held with respect to each load. Since, however, the switching regulator is performing the PWM control till the instant (a middle load) preceding the switching from the switching regulator to the series regulator, efficiency is degraded at the boundary (at the middle load) of the switching.

The series regulator and the switching regulator are simultaneously operated upon switching between the series regulator and the switching regulator to thereby reduce a variation in output voltage at its switching. However, the switching regulator is always in operation under PWM control. Therefore, when the load current increases only slightly in the vicinity of the boundary, the switching regulator suddenly performs switching at about hundreds of KHz, so that the output voltage varies at that moment. Since the switching regulator suddenly stops from the state of being in operation under PWM control even immediately before the load current becomes small and hence the switching regulator is deactivated, the output voltage varies. Since there is a possibility that an LSI will malfunction where the output voltage drops and falls short of the lowest operating voltage of the LSI in particular, a problem arises as to the above power supply device of the LSI operated at the low voltage.

Figure 4:
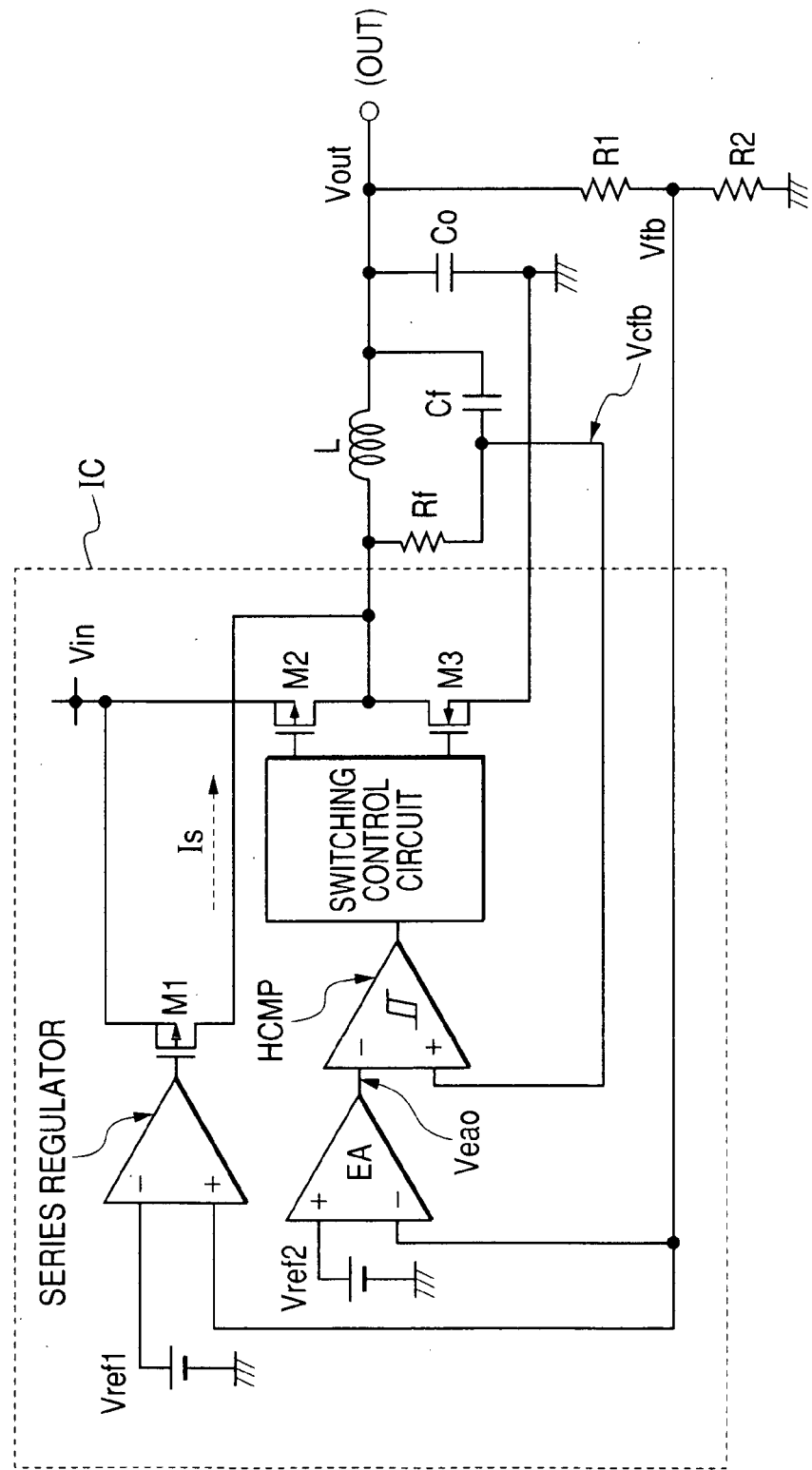
FIG. 4 is a block diagram showing another embodiment of a switching power supply device according to the present invention.

A block diagram of another embodiment of a switching power supply device according to the present invention is shown in FIG. 4. In the present embodiment, a reference voltage Vref2 and a voltage Vfb obtained by dividing an output voltage Vout are inputted to an error amplifier EA from which a voltage corresponding to the difference between the reference voltage Vref2 and the feedback voltage Vfb obtained by dividing the output voltage is inputted to a hysteresis comparator HCMP as an error voltage Veao. Switching is performed between MOSFETM2 and M3 through a switching control circuit for comparing a CR feedback voltage Vcfb and the error voltage Veao. The switching control circuit comprises the above delay circuit that receives the signal outputted from the hysteresis comparator HCMP, and causes both the MOSFETM2 and M3 to have dead bands each indicative of an off state upon their switching.

In the present embodiment circuit, when a light load (about 1 mA) is taken, a MOSFETM1 of a series regulator is always placed in an operating state, and the MOSFETM2 and M3 of the switching power supply circuit are respectively brought to an off state. When a middle load (about 50 mA) is taken, the MOSFETM1 of the series regulator is always in the operating state and the MOSFETM2 and M3 of the switching power supply circuit perform on/off switching operations in correspondence with an output current.

When a heavy load (about 500 mA) is taken, the MOSFETM1 of the series regulator is always in the operating state and the MOSFETM2 and M3 of the switching power supply circuit perform on/off switching operations in association with an output current. They are always in the operating state (on state) regardless of the load current of the MOSFETM1 of the series regulator as described above. The switching operations of the MOSFETM2 and M3 of the switching power supply circuit are performed as follows. That is, when the MOSFETM3 is turned off, the MOSFETM2 is turned on, whereas when the MOSFETM3 is turned on, the MOSFETM2 is turned off.

Figure 5:
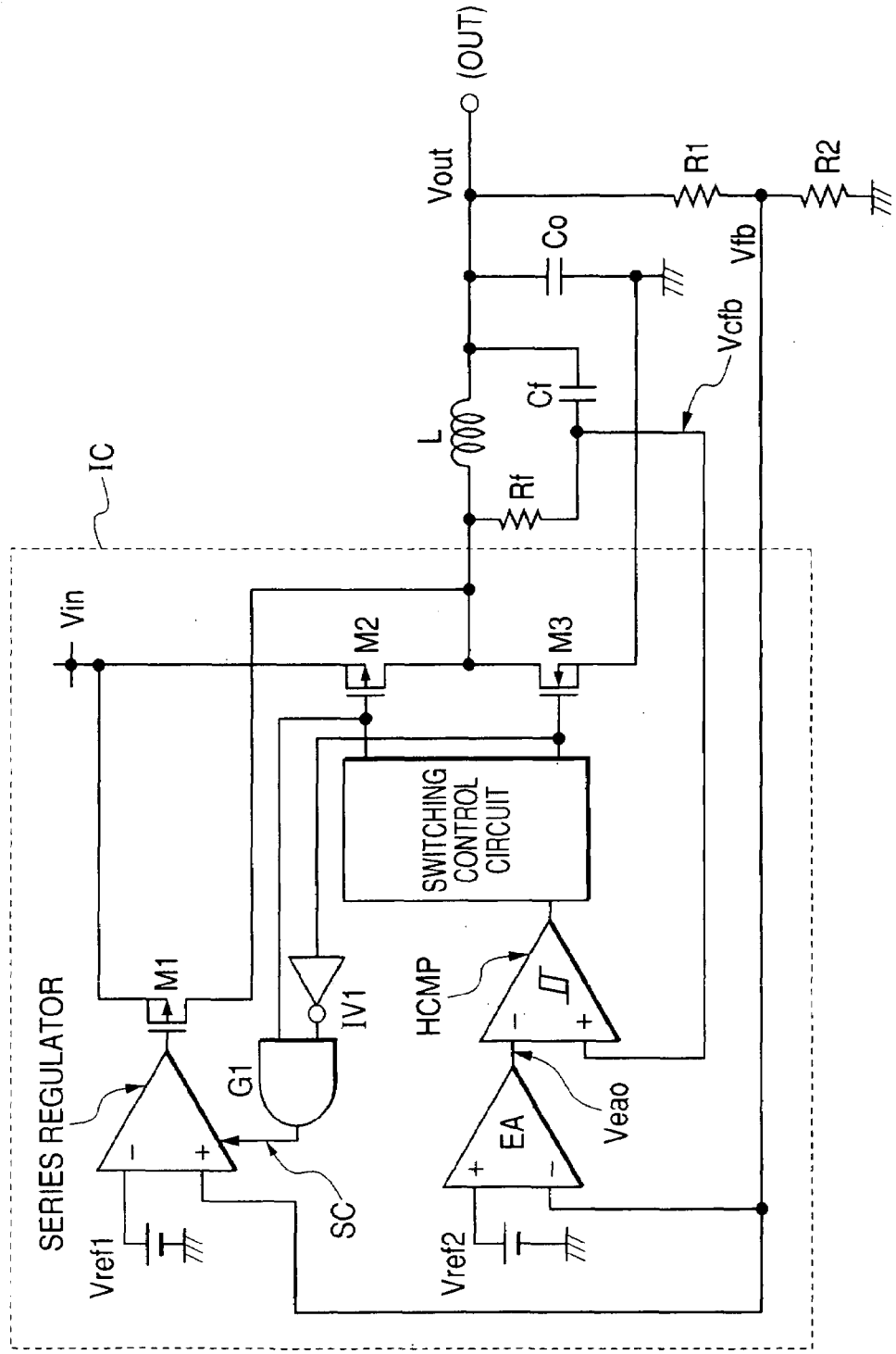
FIG. 5 is a block diagram illustrating a further embodiment of a switching power supply device according to the present invention.

A block diagram of a further embodiment of a switching power supply device according to the present invention is shown in FIG. 5. In the present embodiment, a series regulator is intermittently activated in synchronism with output stage MOSFETM2 and M3 of a switching power supply circuit. A gate voltage of the highside output stage MOSFETM2 of the switching power supply circuit and a gate voltage of the lowside output stage MOSFETM3 are set as inputs to an AND, and the output of the AND is set as an on/off signal of the series regulator. That is, since the highside output stage MOSFETM2 is a P channel MOSFET and the lowside output stage MOSFETM3 is an N channel MOSFET, a control signal supplied to the gate of the MOSFETM3 is determined by an inverter IV1, which in turn is supplied to one input of the AND gate G1. The other input of the AND gate G1 is supplied with a control signal of the P channel MOSFETM2.

Figure 6:
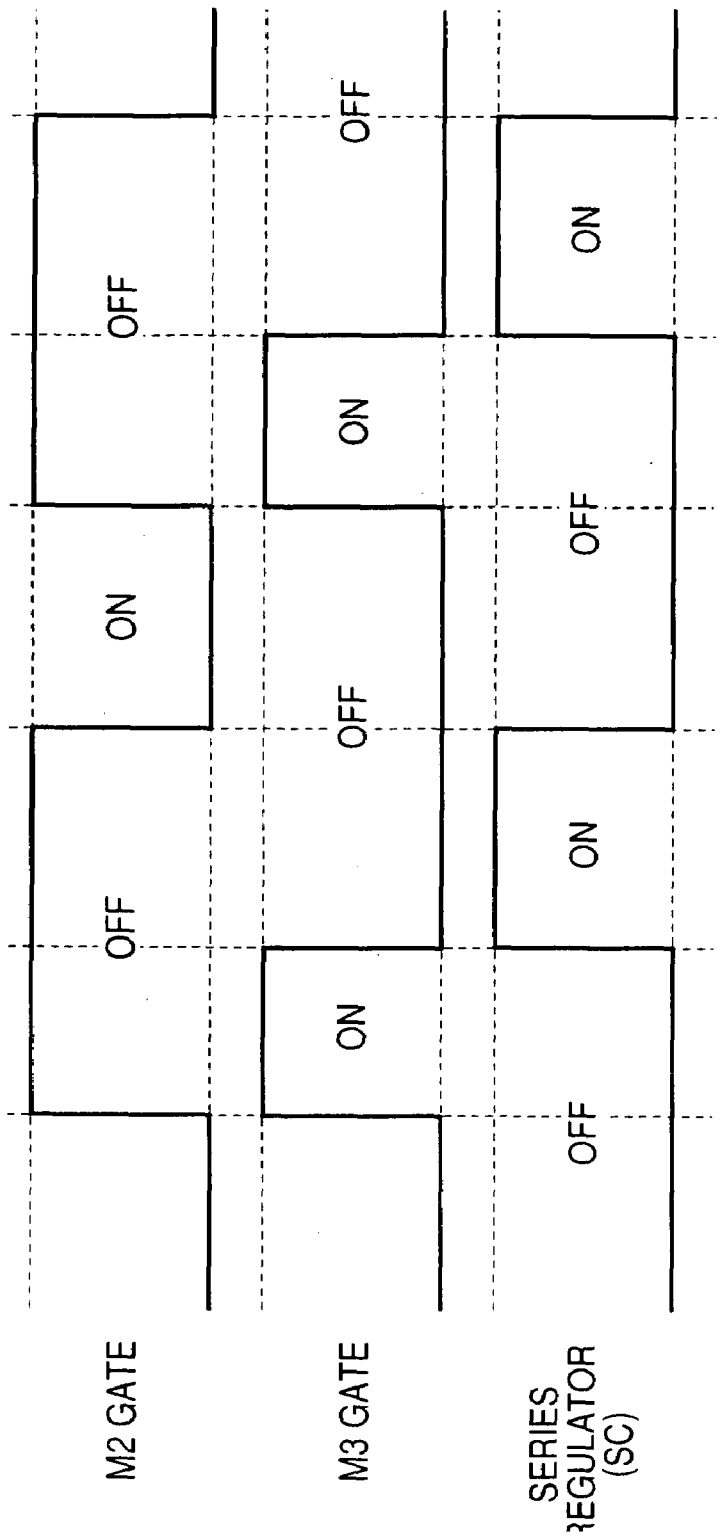
FIG. 6 is a timing diagram for describing the operation of the embodiment circuit shown in FIG. 5.

A timing diagram for describing the operation of the embodiment circuit shown in FIG. 5 is shown in FIG. 6. The series regulator shown in FIG. 5 is operated when the highside output stage MOSFETM2 and lowside output stage MOSFETM3 of the switching power supply circuit are off. That is, when the control signal supplied to the gate of the MOSFETM2 is a high level (logical 1) and the control signal supplied to the gate of the MOSFETM3 is a low level (logical 0), the output signal of the inverter IV1 goes high in level (logical 1) so that the series regulator is brought to an operating state with an operation control signal SC as a high level. In the present embodiment, when a voltage Vlx at a connecting point of the MOSFETM2 and M3 reaches 0 V or more in a discontinuous mode for the purpose of prevention of a reverse current flow, the lowside output stage MOSFETM3 is turned off to perform PFM control. As the load current becomes small, off periods of the output stage MOSFETM2 and M3 are prolonged and hence the output stage MOSFETM2 and M3 are always held off upon a light load, so that the embodiment circuit is activated by the series regulator alone.

When the light load (about 1 mA) is taken as described above in the present embodiment circuit, the MOSFETM1 of the series regulator is always placed in an operating state, and the MOSFETM2 and M3 of the switching power supply circuit are respectively brought to an off state. When a middle load (about 50 MA) is taken, the MOSFETM1 of the series regulator is in the operating state when the MOSFETM2 and M3 are both off. Thus, the MOSFETM2 and M3 of the switching power supply circuit perform on/off switching operations in correspondence with an output current. When a heavy load (about 500 mA) is taken, the MOSFETM1 of the series regulator is brought to the operating state when the MOSFETM2 and M3 are both off. Thus, the MOSFETM2 and M3 of the switching power supply circuit perform on/off switching operations in accordance with an output current.

Figure 7:
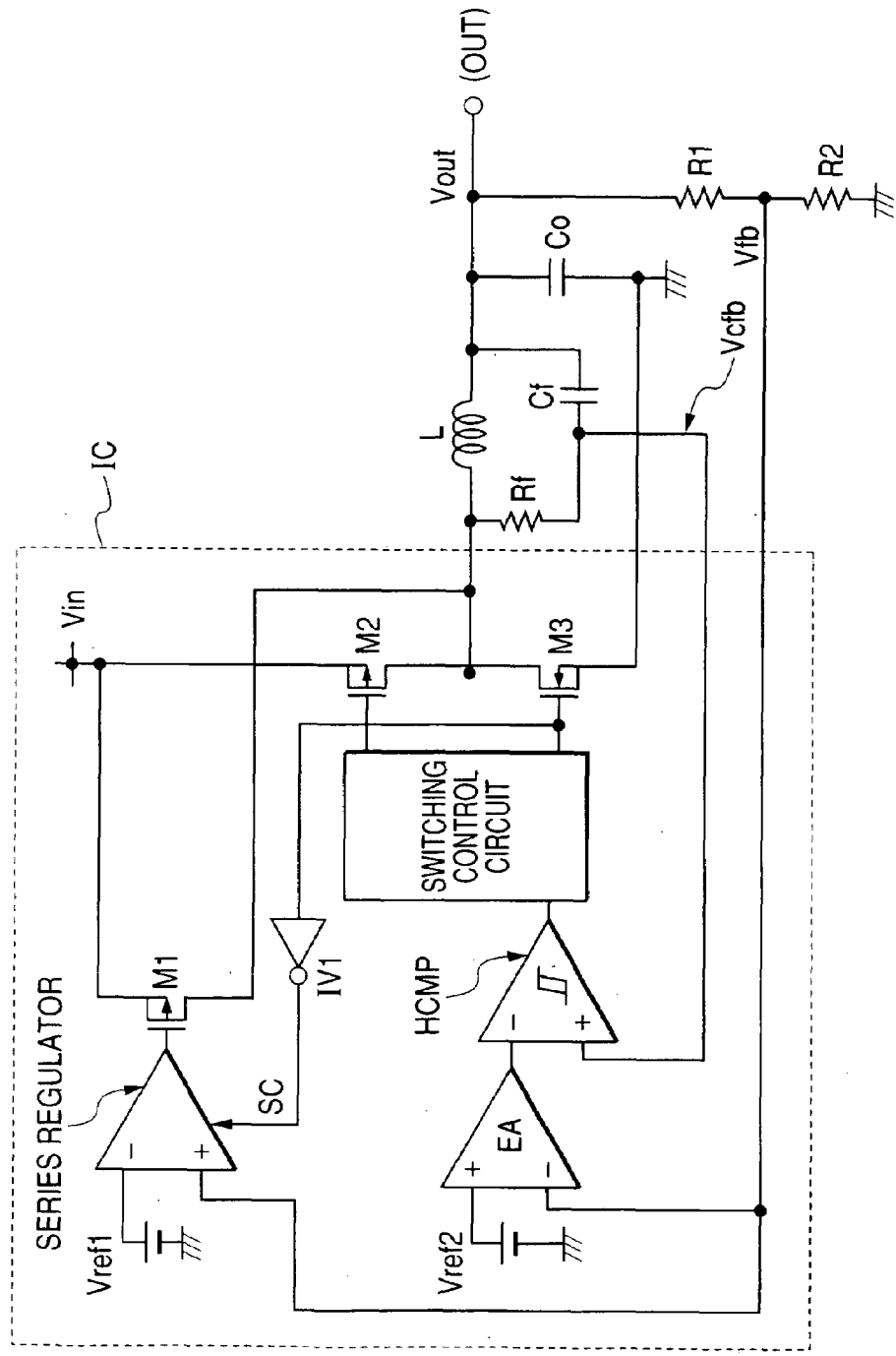
FIG. 7 is a block diagram showing a still further embodiment of a switching power supply device according to the present invention.

A block diagram of a still further embodiment of a switching power supply device according to the present invention is shown in FIG. 7. In the present embodiment, a series regulator is intermittently activated in synchronism with the output stage MOSFETM3 of the switching power supply circuit. A gate voltage of the lowside output stage MOSFETM3 is inverted by an inverter IV1, which is used as an on/off signal of the series regulator. That is, when the gate voltage of the MOSFETM3 is low in level, a signal SC outputted from the inverter IV1 reaches a high level to bring the series regulator to an operating state.

Figure 8:
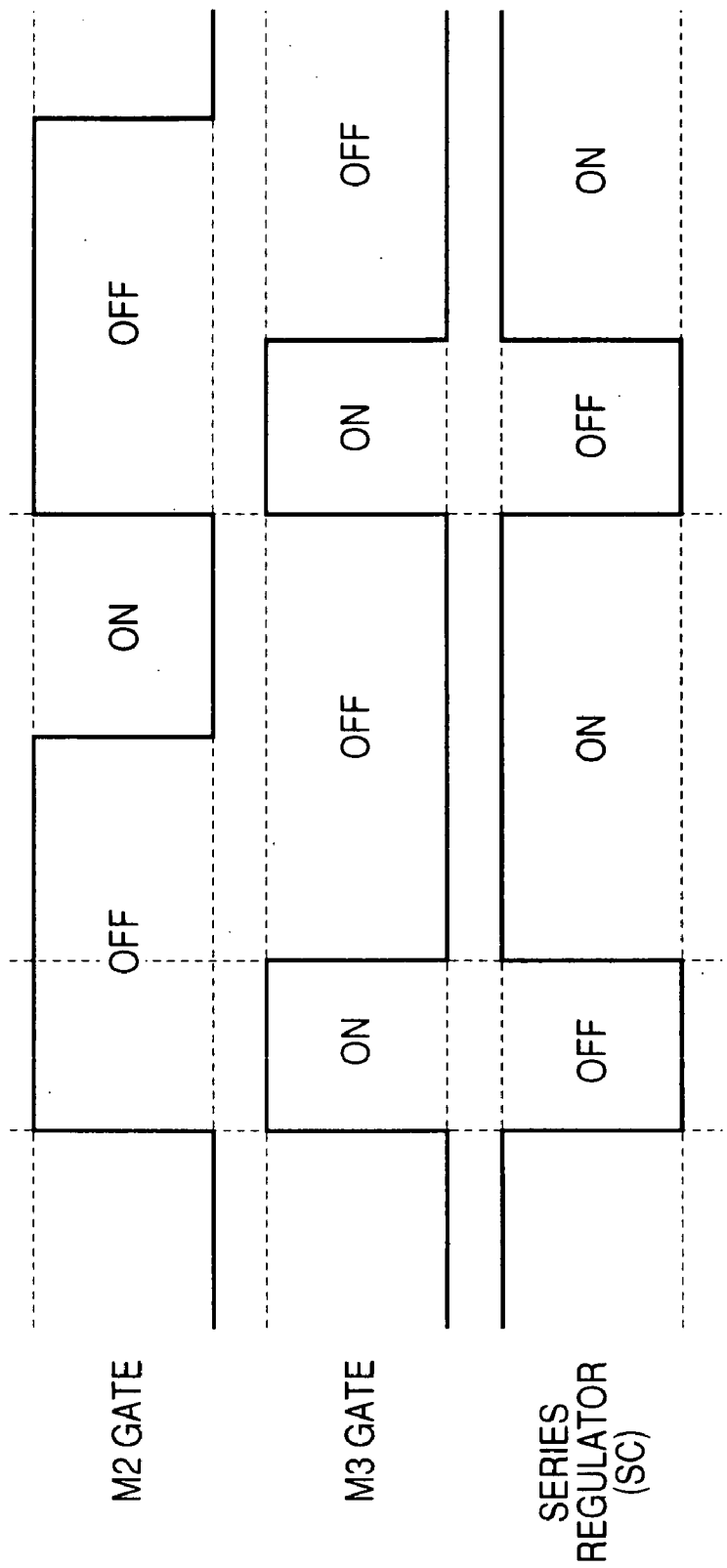
FIG. 8 is a timing diagram for describing the operation of the embodiment circuit shown in FIG. 7.

A timing diagram for describing the operation of the embodiment circuit shown in FIG. 7 is shown in FIG. 8. The series regulator shown in FIG. 7 is brought to a non-operating state/operating state complementarily to the on/off of the MOSFETM3. That is, the series regulator is activated when the lowside output stage MOSFETM3 is in an off state. In a discontinuous mode, the switching power supply circuit is placed under PFM control as described above and an off period of the output stage MOSFETM3 is prolonged as the load current becomes small. Further, the output stage MOSFETM3 is always held off at a light load. Therefore, the embodiment circuit is activated by the series regulator alone.

When a light load (1 mA) is taken in the respective embodiment circuits shown in FIGS. 4, 5 and 7, the switching power supply circuits are automatically deactivated as described above and only the series regulators are operated the in all the embodiment circuits. Therefore, the efficiency is the same as about 53%. The ripple voltage at this time is less than or equal to 1 mV.

Although the ripple voltage is equal to about 20 mV in each embodiment circuit when a middle load (50 mA) is taken, the embodiment shown in FIG. 4 in which the series regulator is always in operation, is worst in efficiency like 91%. Further, the best one is equivalent to the embodiment circuit operated only when the highside MOSFETM2 and the lowside MOSFETM3 are held off upon the intermittent operation of FIG. 5. Its efficiency results in 95%. The efficiency of the embodiment circuit shown in FIG. 7 is 93% corresponding to an intermediate portion between the two. From this point of view, the embodiment circuit shown in FIG. 5 is improved 4% as compared with the embodiment circuit shown in FIG. 4.

When a heavy load (500 mA) is taken, the ripple voltage is the same as 13 mV in each embodiment circuit. Upon such a heavy load, the influence exerted by the operating state of the series regulator is small. Thus, the efficiency is 88% in the embodiment circuit shown in FIG. 4, and the efficiency is identically 89% in the embodiment circuits shown in FIGS. 5 and 7. Further, the intermittent operations of the embodiment circuits shown in FIGS. 5 and 7 provide a 1% improvement in efficiency as compared with the regular operation of FIG. 4. As described above, the embodiment circuit shown in FIG. 4 is inferior in efficiency at the middle load upon the regular operation but simple in circuit configuration. The embodiment circuit shown in FIG. 5 is complex a little in circuit configuration but highest in efficiency. It is understood that the embodiment circuit shown in FIG. 7 lies midway between the embodiment circuit shown in FIG. 4 and the embodiment circuit shown in FIG. 5.

Figure 9:
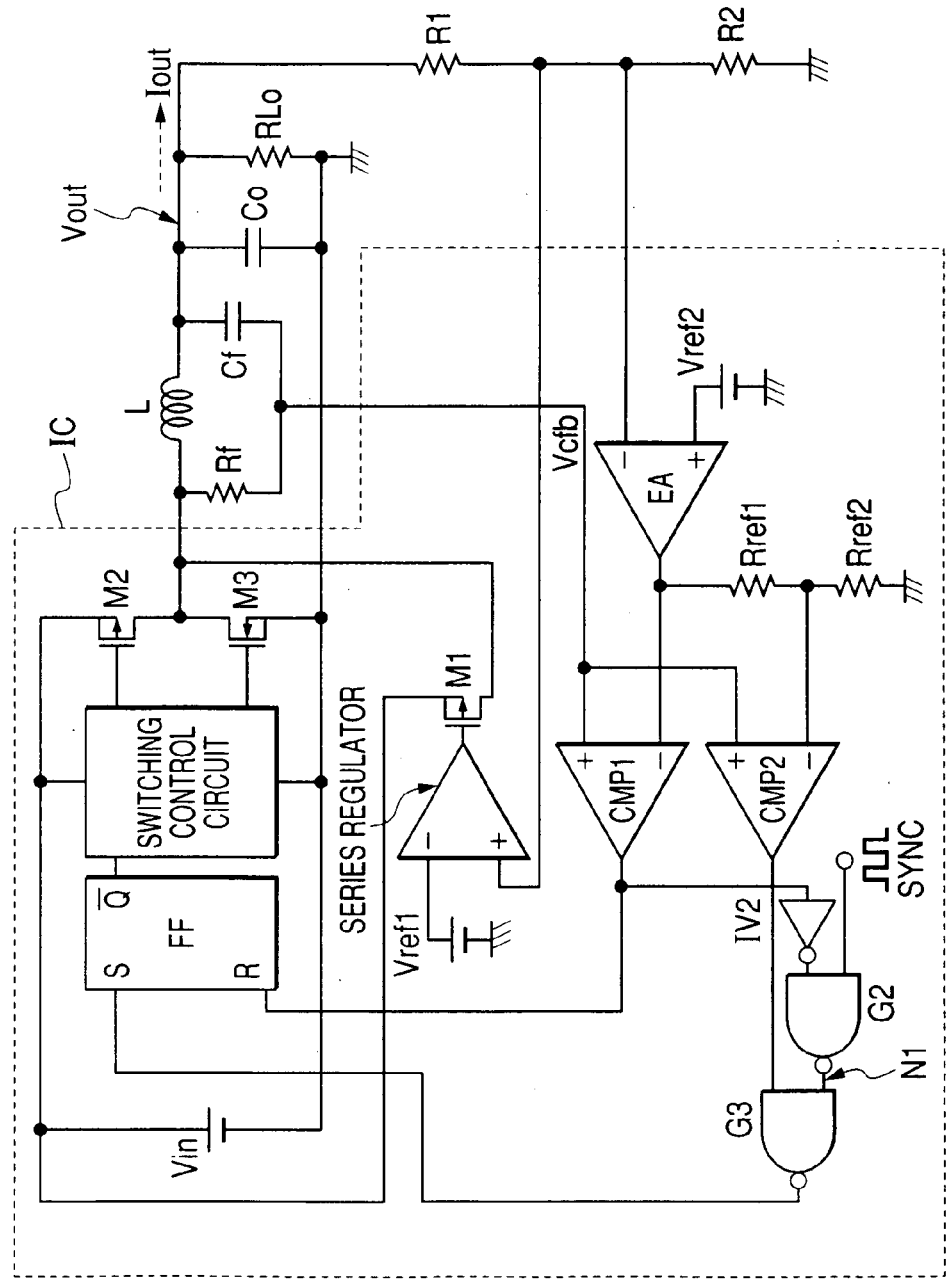
FIG. 9 is a block diagram illustrating a still further embodiment of a switching power supply device according to the present invention.

A block diagram of a still further embodiment of a switching power supply device according to the present invention is shown in FIG. 9. The present embodiment is intended for an external synchronizable series regulator built-in type switching power supply device. The switching power supply device of the present embodiment compares a CR feedback voltage Vcfb and a reference voltage Vref2 by use of two comparators CMP1 and CMP2 to thereby realize a hysteresis operation. Of the two comparators CMP1 and CMP2, the output of one comparator CMP2 is used as a set input (S) of a latch FF via a NAND gate G3.

A signal of an external synchronizing input terminal SYNC for providing external synchronization is supplied to one input of a NAND gate G2. The other input of the NAND gate G2 is supplied with the output of the other comparator CMP1 via an inverter IV2. Thus, the signal of the external synchronizing input terminal SYNC is inputted to a set S of the latch through the two NAND gates G2 and G3 to thereby determine a switching frequency. Then, the CR feedback voltage Vcfb and the reference voltage Vref2 are compared by the comparator CMP1 and the resultant output is used as a reset signal R, whereby PWM control for determining on and off times of switching is carried out. The normal hysteresis operation can be performed where the external synchronizing input terminal SYNC is connected to GND.

A signal outputted from an error amplifier EA similar to the embodiment circuit of FIG. 7 is supplied to an inversion input (-) of the comparator CMP1. A voltage obtained by dividing the output signal of the error amplifier EA by resistors Rref1 and Rref2 is supplied to an inversion input (-) of the comparator CMP2. Since the gate circuit G2 is operated as an inverter owing to such division resistors Rref1 and Rref2 when the external synchronizing input terminal SYNC is constantly connected to GND, the output signal of the comparator CMP1 is transmitted to the gate G3, thereby making it possible to cause the two comparators CMP1 and CMP2 to perform a hysteresis operation.

Figure 10:
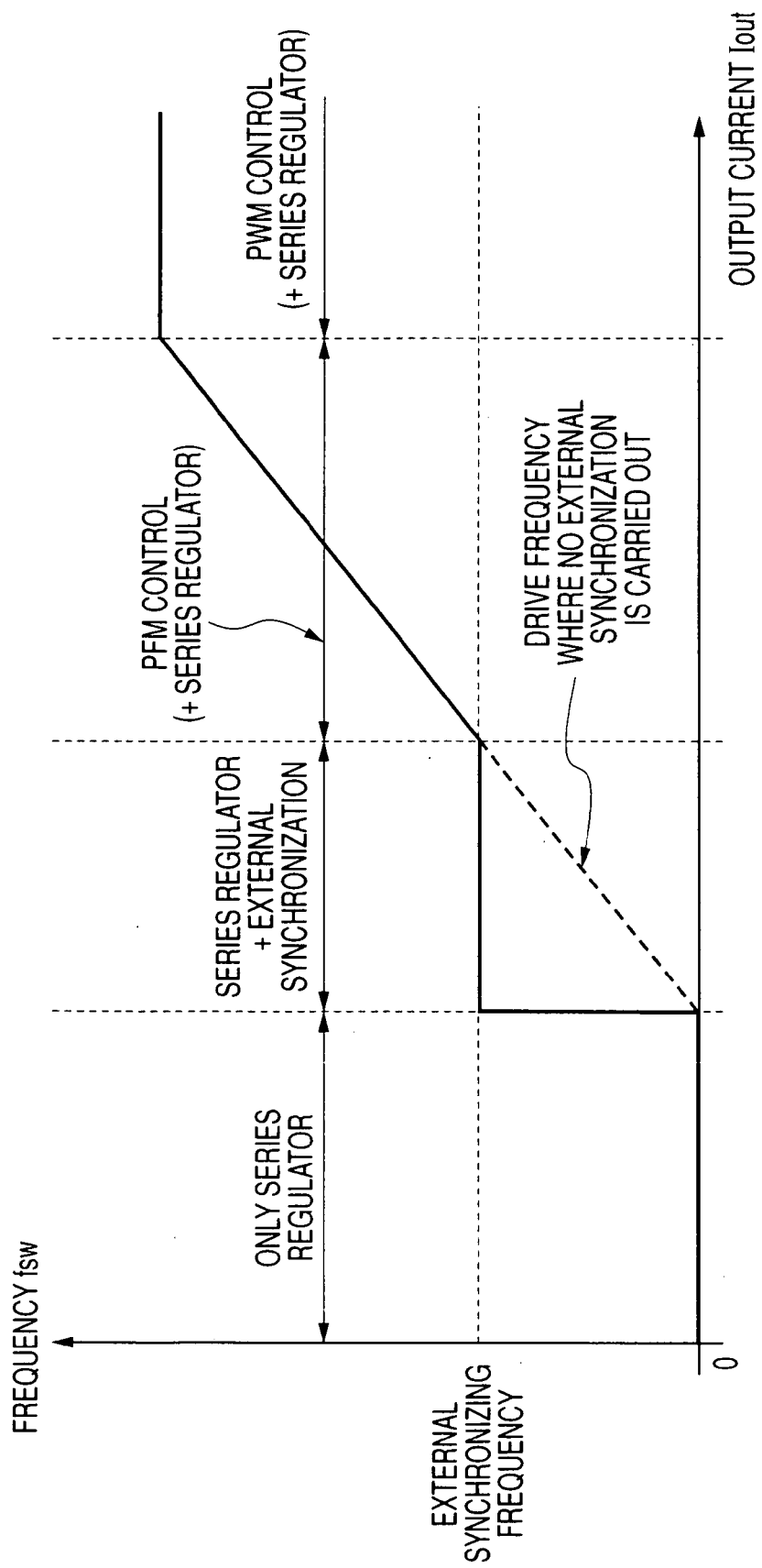
FIG. 10 is a characteristic diagram for describing the operation of the switching power supply device shown in FIG. 9.

A characteristic diagram for describing the operation of the switching power supply device shown in FIG. 9 is shown in FIG. 10. The relationship of a drive frequency of the switching regulator to a load current Iout of the external synchronous switching power supply device is shown in the same figure. The switching power supply device is operated under PWM control upon a heavy load as in the same figure, and the external synchronization is performed in a region in which the drive frequency is less than or equal to an external clock frequency under PFM control. Further, when the load current becomes small and the supply of the output current is enabled by the series regulator alone, the external synchronization is invalidated and the switching power supply device is activated by the series regulator alone.

Under the PFM control as described above, the switching frequency of the switching power supply circuit is reduced to an audible range (20 Hz through 20 KHz) with a reduction in the load current Iout. When the switching power supply device is operated at such a frequency, the frequency might be transferred to the ears as noise depending on electronic equipment to be used. In particular, an audio device or the like shows a problem where the switching frequency is reduced to the audible range. Therefore, the external synchronizing input terminal SYNC can be utilized so as not to reduce the drive frequency at the PFM control to the audible range (20 Hz through 20 KHz) or less. That is, if, for example, a pulse of 40 KHz greater than the audible range (20 Hz through 20 KHz) is inputted from the external synchronizing input terminal SYNC, then the PFM operation is carried out in synchronism with the pulse of 40 KHz inputted from the external terminal SYNC where the drive frequency at the PFM control reaches 40 KHz or less.

Figure 11:
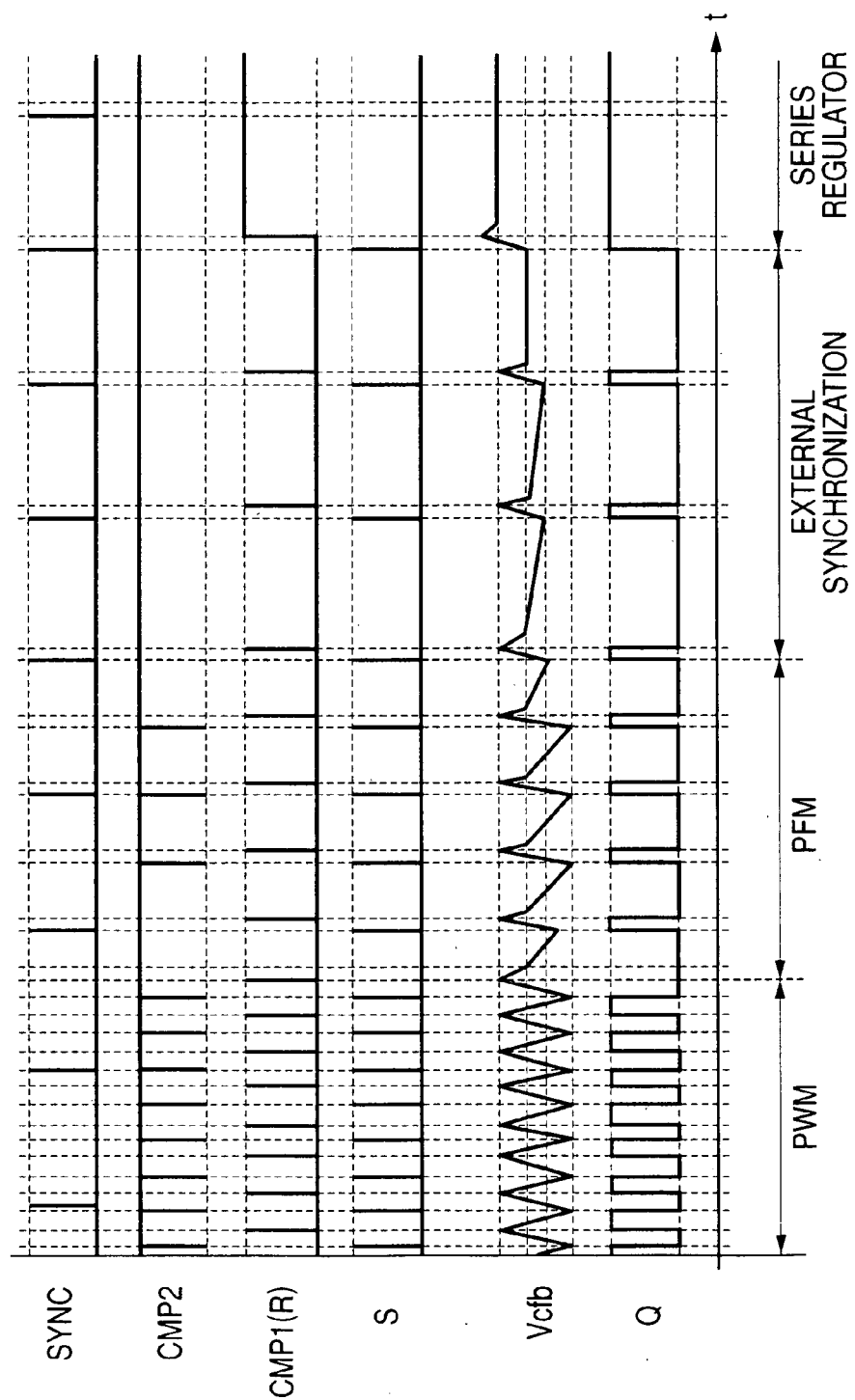
FIG. 11 is a timing diagram for describing the operation of the switching power supply device shown in FIG. 9.

A timing diagram for describing the operation of the switching power supply device shown in FIG. 9 is shown in FIG. 11. Now consider where the clock frequency for external synchronization is set to 40 KHz higher than the audible range as described above. Since, at this time, the output signal of the comparator CMP2 is inputted to the set earlier than the external clock signal upon the heavy load after reset is made based on the output signal of the comparator CMP1, PWM control is carried out which is operated at the frequency synchronized with the comparator CMP2. When the load current becomes small and a discontinuous mode is reached, the switching power supply device is brought to the PFM control.

Since the output signal of the comparator CMP2 is inputted to the set earlier than the external clock signal when the drive frequency is larger than 40 KHz in the range of the PFM control, the switching power supply circuit performs switching at the frequency synchronized with the output signal of the comparator CMP2. When, however, the load current becomes smaller and the drive frequency is intended to assume the external clock frequency 40 KHz or less, the external clock signal is inputted to the set earlier than the output signal of the comparator CMP2 this time. Therefore, the switching power supply circuit performs switching at the frequency synchronized with the external clock frequency.

When the load current is further reduced and lessened until the current can be supplied by only the series regulator, the current supplied from the switching regulator becomes larger than the load current where the switching power supply circuit performs switching at the frequency synchronized with the external clock signal. Thus, the output voltage Vout rises slightly and the CR feedback voltage Vcfb also rises. Therefore, since the output voltage of the comparator CMP1 is brought to a high level and a node N1 corresponding to the output of the gate G2 is also taken high in level, a low level continues to be inputted to the set. As a result, the switching regulator stops switching and the switching power supply device is operated by only the series regulator. Thus, only when the switching power supply circuit intends to perform switching at the frequency lying in the audible range after the input of the external sync signal, the switching frequency is fixed to the external clock frequency, and high efficiency can be maintained in a wide range while noise is being reduced. Since the switching power supply device is activated by only the series regulator upon a light load, a low ripple voltage can also be maintained.

Figure 12:
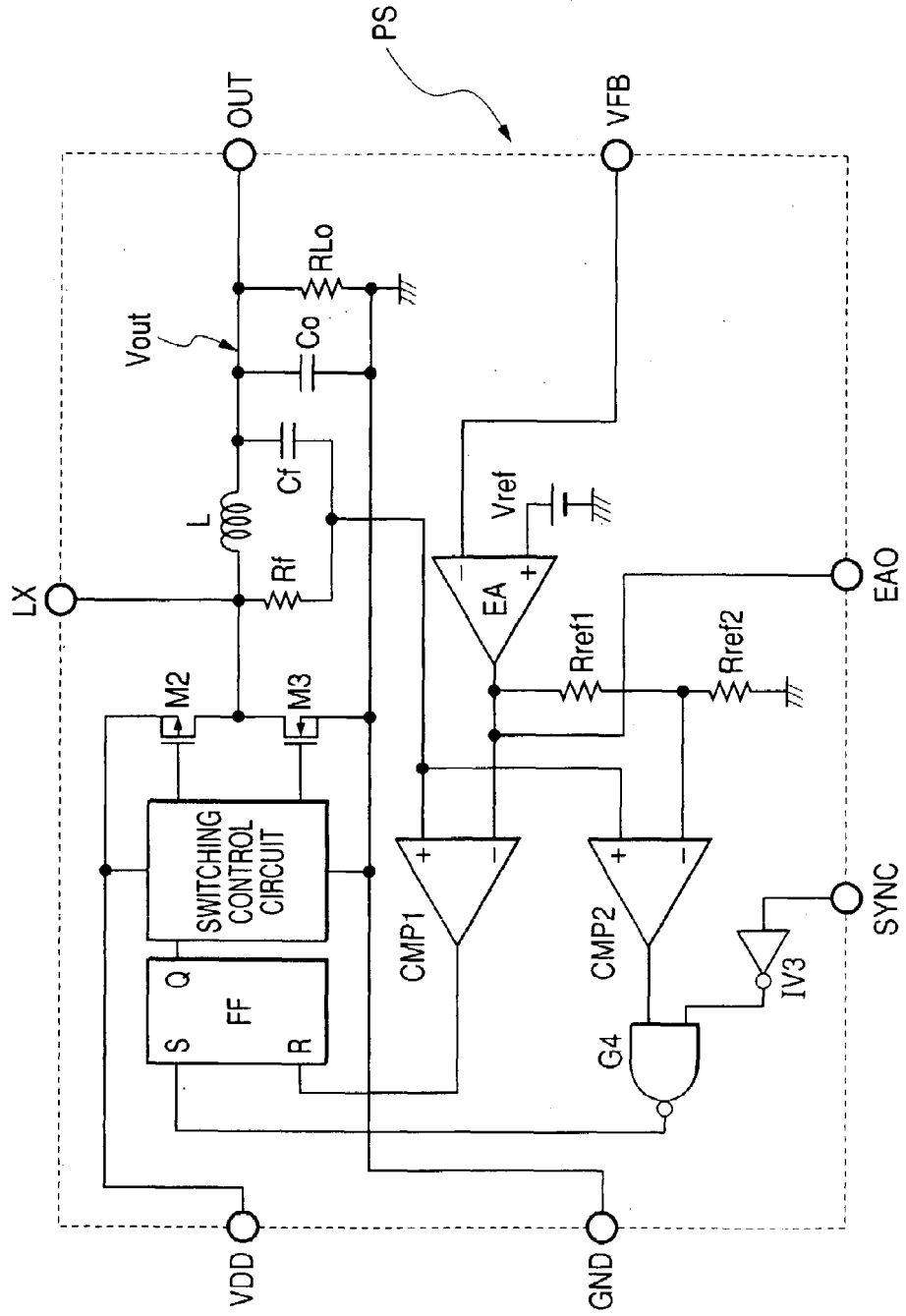
FIG. 12 is a block diagram illustrating a still further embodiment of a switching power supply device according to the present invention.
Figure 13:
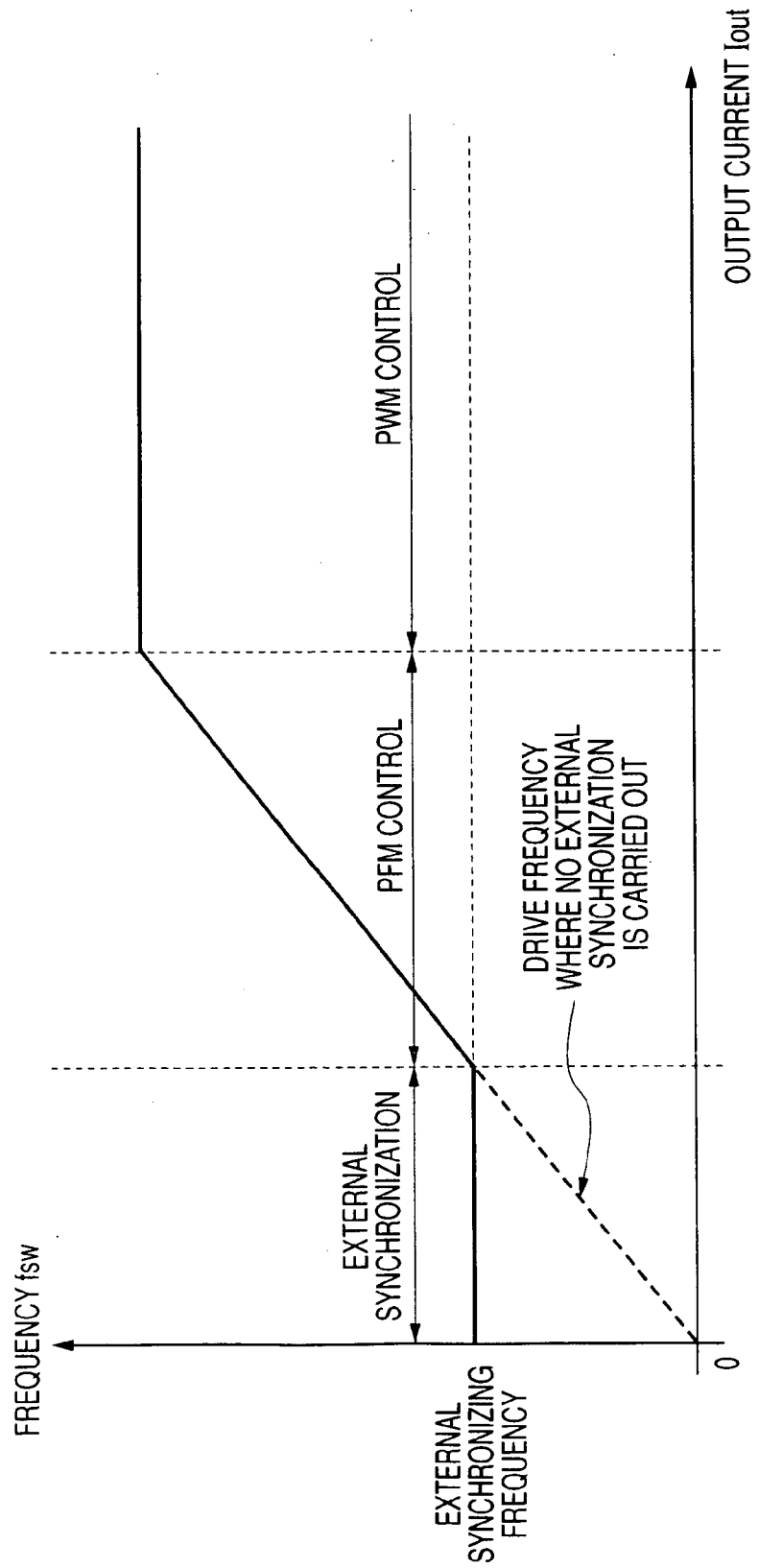
FIG. 13 is a characteristic diagram for describing the operation of the switching power supply device shown in FIG. 12.

A block diagram of a still further embodiment of a switching power supply device according to the present invention is shown in FIG. 12. The switching power supply device according to the present embodiment is basically equivalent to one in which the series regulator is eliminated from the embodiment circuit of FIG. 9. The present embodiment is capable of realizing the function of setting a drive frequency to about 40 KHz as described above as indicated by a characteristic diagram of FIG. 13 under PFM control and thereby preventing the switching frequency of the switching power supply circuit from being reduced to the audible range (20 Hz through 20 KHz) due to a reduction in the load current Iout. The provision of such a function makes it possible to prevent the transfer of the frequency to the ears as noise depending on electronic equipment to be used. This is profitable to an audio device in particular.

A node corresponding to a mutual connecting point of MOSFETM2 and M3 is connected to an external terminal LX in order to further realize a new function. Although not restricted in particular, an output node of an error amplifier EA is also connected to an external terminal EA0. That is, the switching power supply device PS is provided with an output terminal OUT, an input terminal VDD, a ground terminal GND and an external synchronizing input terminal SYNC in addition to the above. The input terminal VDD is supplied with an input voltage Vin supplied from the battery or the like, and an output voltage Vout supplied to a load circuit is formed from the output terminal OUT. A terminal VFB is supplied with a feedback voltage obtained by dividing the output voltage Vout.

Figure 14:
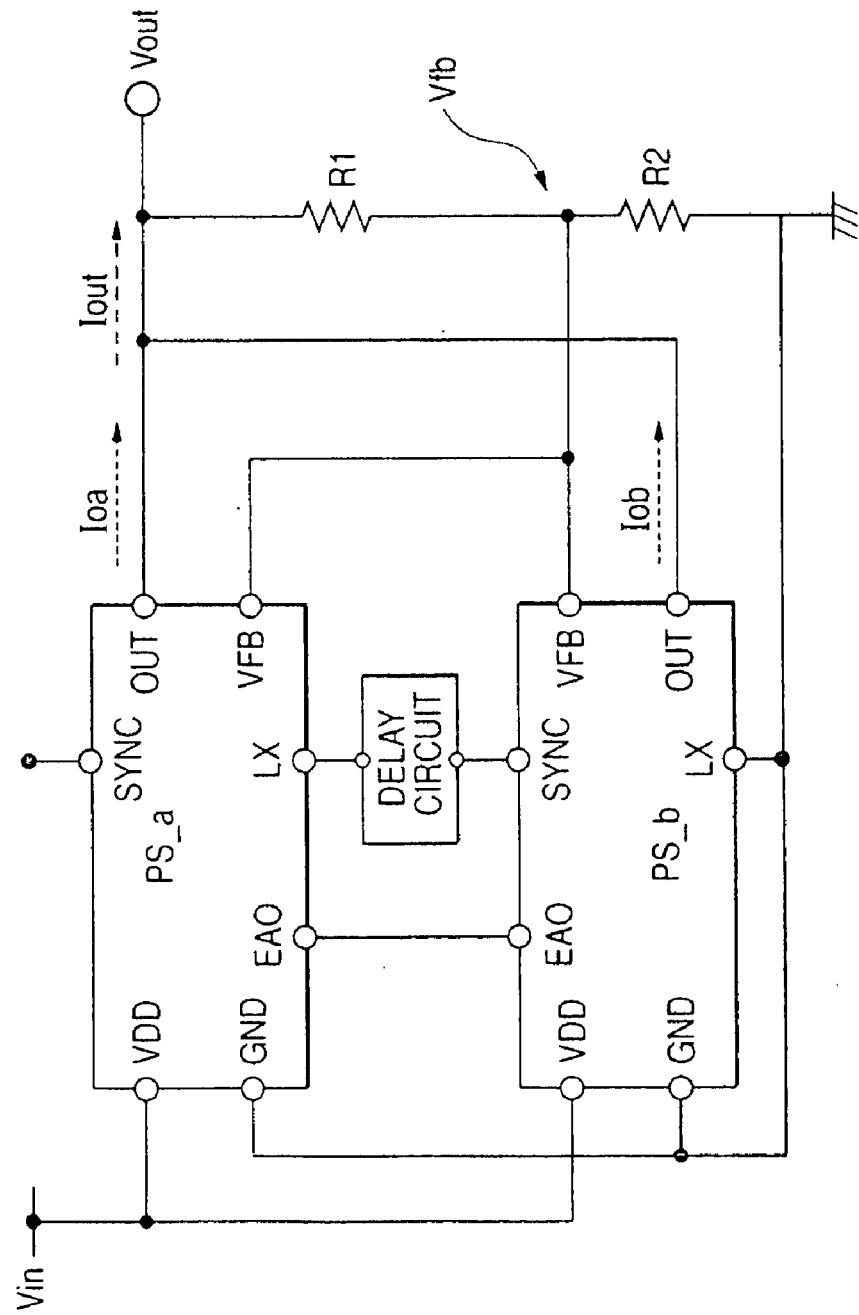
FIG. 14 is a block diagram showing a still further embodiment of a switching power supply device according to the present invention.

A block diagram of a still further embodiment of a switching power supply device according to the present invention is shown in FIG. 14. There is a limit to the current that can be supplied by one switching power supply circuit. The switching power supply circuits each using the CR feedback hysteresis control shown in FIG. 12 are parallel-connected in plural forms as in the present embodiment, thereby making it possible to supply a large output current without using complex circuits for performing load sharing. That is, as shown in the same figure, the two power supply devices PS each shown in FIG. 12 are used and a delay circuit is simply added to thereby enable a parallel redundancy operation. In order to carry out the parallel redundancy operation, a division voltage Vfb obtained by dividing the output voltage Vout by resistors R1 and R2 is commonly inputted to unillustrated error amplifiers EAa and EAb of their power supply devices PS_a and PS_b via feedback terminals VFB of the power supply devices PS_a and PS_b. Then, output voltages at the time that the feedback voltage Vfb of the output voltage and reference voltages Vref2a and Vref2b are respectively inputted to the error amplifiers EAa ad EAb, are respectively outputted as error voltages Veaoa and Veaob. Further, the error voltages Veaoa and Veaob of the power supply devices PS_a and PS_b are connected to each other by the terminals EAO outside the power supply devices PS_a and PS_b, thereby enabling load sharing.

The relationships between the CR feedback voltage Vcfb and the error amplifier voltages Veaoa and Veaob in FIG. 14 are expressed in the following equations (3) and (4):

$$Vcfba = Vout + DCRa \times Ioa \approx Veaoa \quad (3)$$

$$Vcfbb = Vout + DCRb \times Iob \approx Veaob \quad (4)$$

When the inductance values of smoothing coils connected to the power supply devices PS_a and PS_b are the same, Vcfb≈Vcfbb, Veaoa≈Veaob and DCRa≈DCRb (parasitic resistance values of inductances L of PS_a and PS_b: DCRa and DCRb) are made since the internal resistance of each coil generally has an error of about 10%,. Thus, output currents Ioa and Iob of the power supply devices PS_a and PS_b result in Ioa≈Iob from the equations (3) and (4), so that load sharing is achieved. As described above, the feedback voltage Vfb obtained by dividing the output voltage Vout is used in common and the output voltages Veaoa and Veaob of the error amplifiers are connected to each other, thereby making it possible to perform load sharing to each of the power supply devices PS without the need for complicated circuits of the power supply devices PS.

Figure 15:
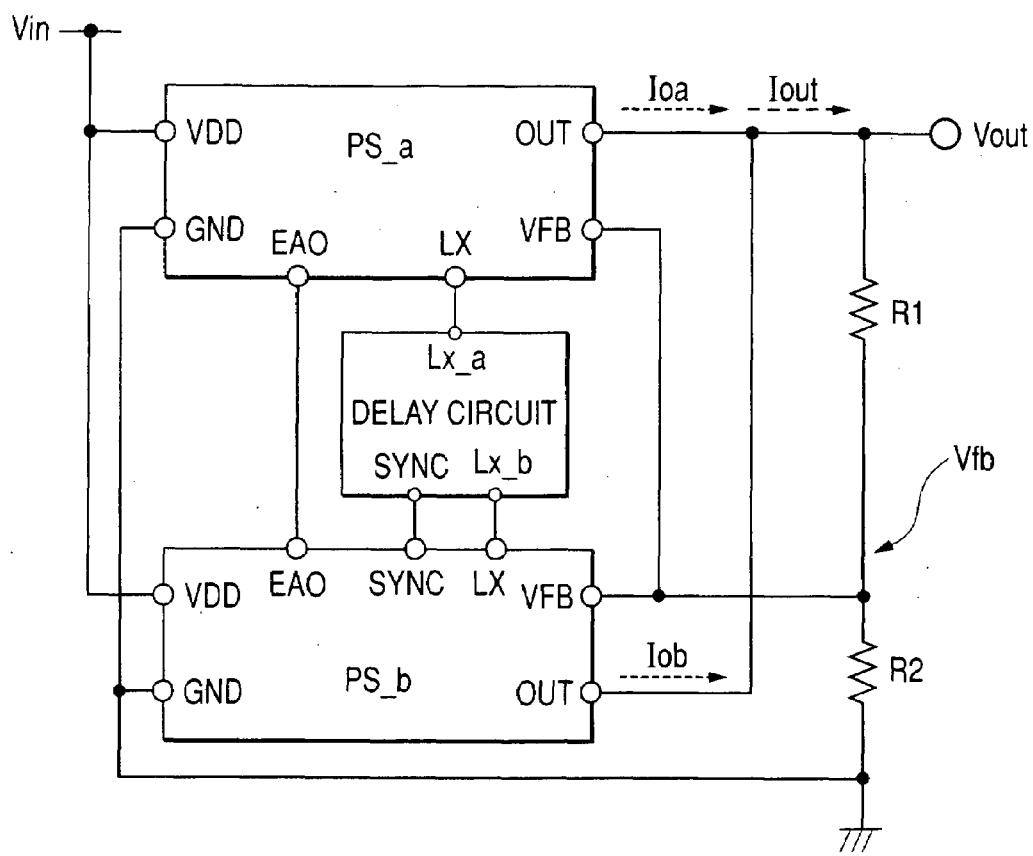
FIG. 15 is a block diagram illustrating a still further embodiment of a switching power supply device according to the present invention.

A block diagram of a still further embodiment of a switching power supply device according to the present invention is shown in FIG. 15. In the present embodiment, LX terminals of power supply devices PS_a and PS_b and a SYNC terminal are connected to one another through a delay circuit. Adjustments to delay times are made by the delay circuit to displace the phases of output stage switches of the power supply devices PS_a and PS_b by 180° with respect to each other, thereby reducing a ripple voltage of an output voltage Vout without increasing the capacitance of an output capacitor Co.

Figure 16:
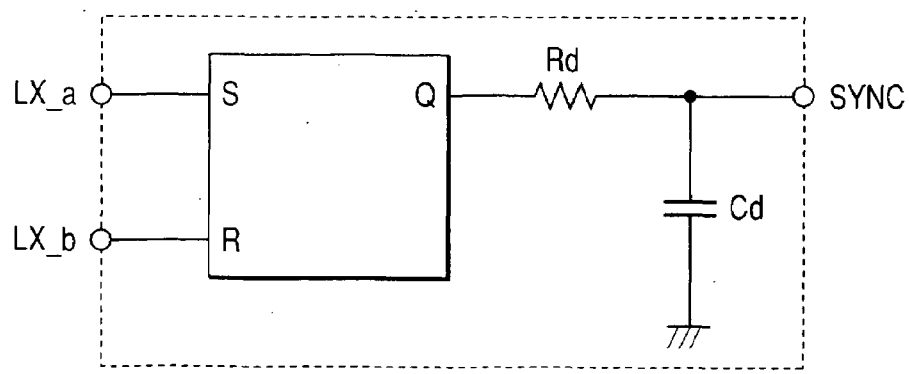
FIG. 16 is a circuit diagram showing one embodiment of a delay circuit employed in the switching power supply device shown in FIG. 14.

A circuit diagram of one embodiment of the delay circuit employed in the switching power supply circuit shown in FIG. 14 is shown in FIG. 16. An integration circuit (time constant circuit) comprising a resistor Rd and a capacitor Cd is provided at the output of the flip-flop (latch) circuit. A terminal LX_a of the power supply device PS_a is connected to its corresponding set input S of the flip-flop circuit, and a terminal LX_b of the power supply device PS_b is connected to its corresponding reset input R thereof. An output terminal SYNC of the delay circuit is connected to a synchronous input terminal SYNC of the power supply device PS_b.

Figure 17:
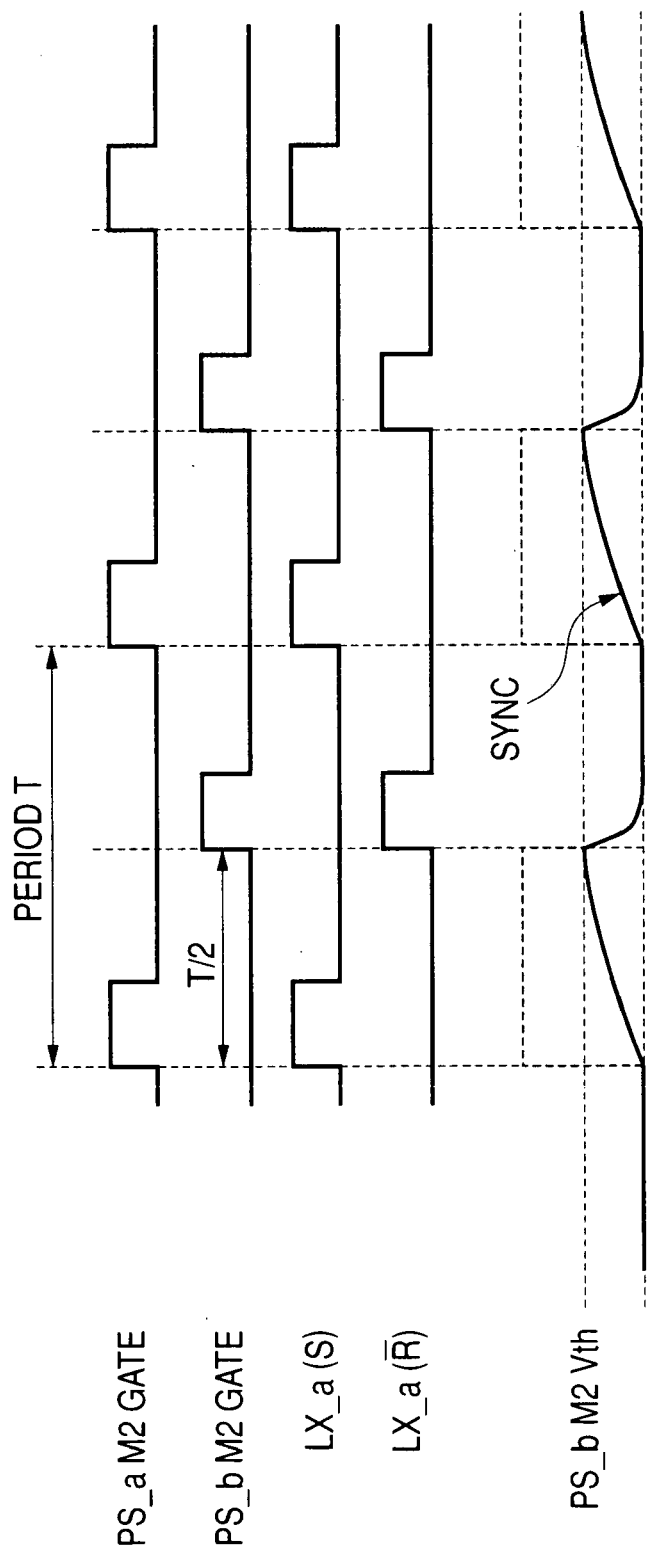
FIG. 17 is a timing diagram for describing the operation of the delay circuit shown in FIG. 16.

A timing diagram for describing the operation of the delay circuit shown in FIG. 16 is shown in FIG. 17. When a gate voltage of a MOSFETM2 of the power supply device PS_a is brought to a high level, a signal LX_a(S) inputted to the delay circuit is taken high in level correspondingly. Thus, a signal Q outputted from the flip-flop circuit changes to a high level and an output signal SYNC is integrated by the resistor Rd and the capacitor Cd, after which the integrated signal rises. When the integrated output reaches a threshold voltage Vth of the MOSFETM2 of the power supply device PS_b, the flip-flop circuit FF of the power supply device PS_b is set so that the MOSFETM2 is brought to an on state. This timing is set to ½ (T/2) of a switching period T of the power supply device PS_a so that the phase of the output stage switch of the power supply device PS_b can be displaced by 180° with respect to the switching period of the power supply device PS_a.

Figure 18:
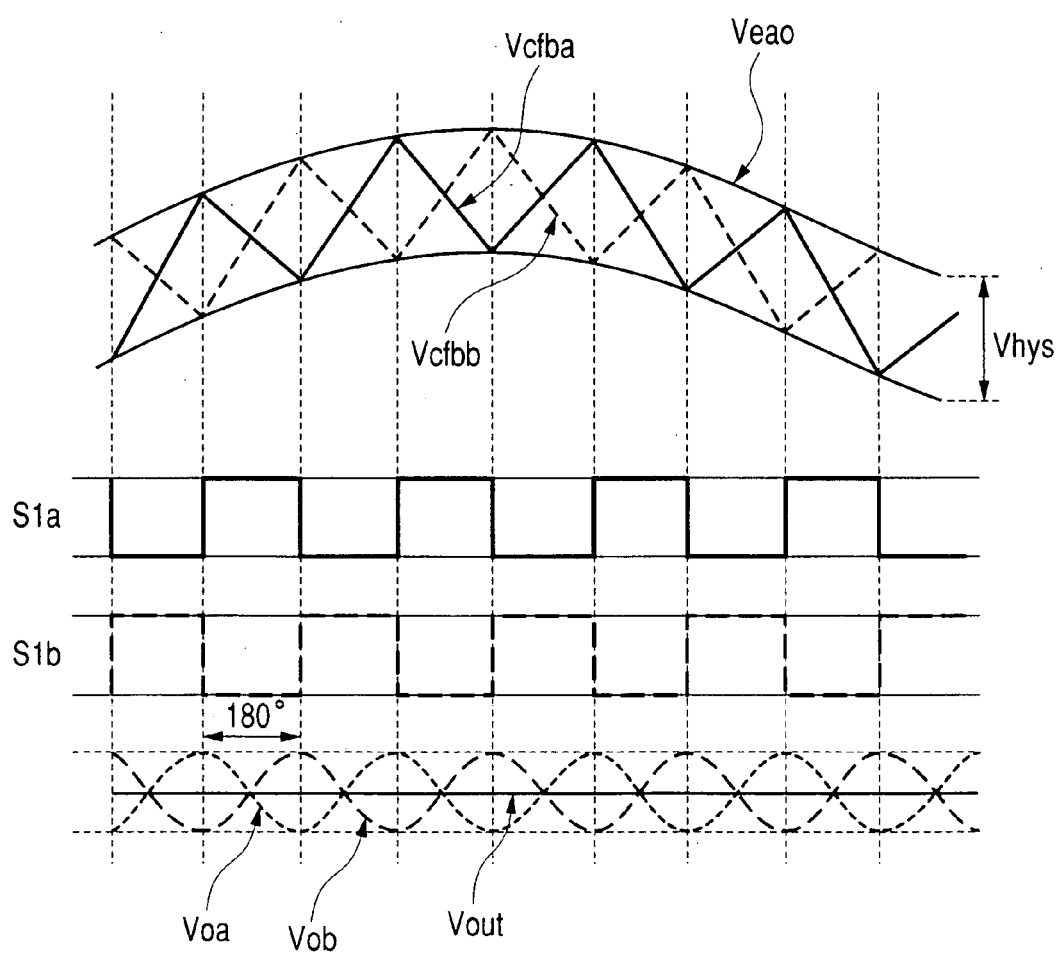
FIG. 18 is an operation waveform diagram where the phases of switching operations of the switching power supply device shown in FIG. 15 are displaced by 180° with respect to each other.

FIG. 18 shows an operation waveform diagram where the phases of the output stage switches of the power supply devices PS_a and PS_b are displaced by 180° with respect to each other. By displacing the phases of the output stage switches of the two power supply devices PS_a and PS_b by 180° with respect to each other in this way, the ripple of the output voltage Vout can be greatly reduced. Further, the switching regulators are parallel-connected in plural forms more than or equal to two and the phases of the output stage switches are displaced and made active (phase-shifted), thereby making it possible to supply a larger output current at a small ripple voltage. Since the input current is also averaged as well as the output current by phase shifting, a noise reduction of a main power supply is achieved.

While the invention made above by the present inventors has been described specifically based on the embodiments, the present invention is not limited to the embodiments. Various changes can be made thereto within the scope not departing from the gist thereof. For instance, a parallel circuit comprising a resistor or resistance R and a capacitor C may be provided between the node n2 corresponding to the mutual connecting point of the resistor Rf and the capacitor Cf shown in, for example, FIG. 1 and the circuit's ground potential GND shown therein. This configuration has the advantage of being capable of adjusting an output voltage Vout at the ratio of the resistances Rf and R. That is, the output voltage Vout is given as Vout=R/(Rf+R)·Vref2. Thus, the adjustment to the ratio of the resistances Rf and R makes it possible to arbitrarily set the output voltage Vout without varying the reference voltage Vref2. The capacitor C is provided to prevent degradation of a transient response characteristic due to the occurrence of a phase delay and a phase lead with the provision of the resistor R. The resistance values and the capacitance values are set so as to assume Rf·Cf=R·C, thereby making it possible to reduce the phase delay and the phase lead.

Specific configurations of the hysteresis comparator HCMP and the error amplifier EA can take various embodiments. The switch elements and the output elements of the series regulator may be replaced with bipolar transistors in addition to MOSFETs. Specific configurations of the differential amplifier circuits or the operational amplifier circuits employed in the comparators CMP1 and CMP2 and the series regulator can also take various embodiments. Further, a specific configuration of the delay circuit used to connect parallel-connect the switching power supply circuits in plural forms can also take various embodiments. The present invention can be widely used as a switching power supply device and a semiconductor integrated circuit employed therein.

What is claimed is:

1. A switching power supply device, comprising:
   an inductor, wherein an input of said inductor is connected to a connecting point of the inductor;
   a switch element which controls a current that flows through the inductor, said switch element being connected between an input voltage and said connecting point of the inductor;
   a clamp element which clamps a back electromotive voltage generated across the inductor to a predetermined potential when the switch element is in an off state, said clamp element being connected between said connecting point of the inductor and an output of said inductor;
   a series circuit provided in a parallel configuration with the inductor and comprising a resistive element and a capacitive element, said series circuit being connected between said connecting point of the inductor and said output of the inductor; and
   a voltage comparator having first and second threshold voltages which are different from each other,
   wherein the current supply side of the switch element is supplied with the input voltage, a load circuit is supplied with a load current from the output of the inductor, and discrimination is made, by said voltage comparator, between a voltage obtained from a connecting point, between the resistive element and the capacitive element, of the series circuit and each of the first and second threshold voltages,
   wherein results of the discrimination between the voltage obtained from the connecting point of the series circuit and each of the first and second threshold voltages are used to control the switch element and to regulate the voltage obtained from the connecting point of the series circuit to be equal to the first threshold voltage, thereby varying the current flowing through the inductor in accordance with a variation in the load current; and
   wherein said switching power supply device is provided with an external sync input control circuit which has a sync terminal input with a synchronizing signal for periodically bringing the switch element to an on state when a frequency of conducting the discrimination performed by the voltage comparator is less than or equal to a predetermined frequency.

2. A switching power supply device according to claim 1, wherein the predetermined frequency is a frequency higher than an audio frequency.

3. A switching power supply device according to claim 1, wherein a first terminal for detecting a voltage at a connecting point of the switch element and the inductor is provided.

4. A switching power supply device according to claim 1, further comprising:
   a plurality of switching power supply devices,
   wherein a first terminal for detecting a voltage at the connecting point of the switch element and the inductor is provided,
   wherein a voltage inputted to the plurality of switching power supply devices is used in common,
   wherein the load circuit is supplied with load currents of the switching power supply devices, and
   wherein the first terminal in one of the switching power supply devices and the sync terminal in the other of the switching power supply devices are coupled to each other through a delay circuit.

5. A switching power supply device according to claim 4, wherein the delay circuit forms such delay signals that the phases of switching operations of first and second switching power supply devices differ from each other.

6. A switching power supply device according to claim 4, further comprising:
   a division circuit which divides a voltage output from the output of the inductor and supplies a divided voltage to the load circuit; and
   a plurality of error amplifiers which form an output voltage corresponding to a difference between the divided voltage and a predetermined reference voltage,
   wherein in the plurality of switching power supply devices, output points for supplying the load currents to the load circuit, input points for supplying voltages for driving the first and second switching power supply devices, and a connecting point for dividing an output voltage for measuring the output voltage of the load circuit, are respectively coupled to one another, and output points of first and second error amplifiers are coupled to each other.

* * * * *